(12) United States Patent
Chen et al.

(10) Patent No.: US 12,474,548 B2
(45) Date of Patent: Nov. 18, 2025

(54) OPTICAL LENS ASSEMBLY AND A HEAD-MOUNTED ELECTRONIC DEVICE

(71) Applicant: NEWMAX TECHNOLOGY CO., LTD., Taichung (TW)

(72) Inventors: Po-Yu Chen, Taichung (TW); Ping-Yi Chen, Taichung (TW); Fei-Hsin Tsai, Taichung (TW)

(*) Notice: Subject to any disclaimer, the term of this patent is extended or adjusted under 35 U.S.C. 154(b) by 759 days.

(21) Appl. No.: 17/892,929

(22) Filed: Aug. 22, 2022

(65) Prior Publication Data

US 2023/0341659 A1    Oct. 26, 2023

(30) Foreign Application Priority Data

Apr. 22, 2022  (TW) .................................. 111204209
Jun. 15, 2022  (TW) .................................. 111122243

(51) Int. Cl.
*G02B 13/00*   (2006.01)
*G02B 9/04*    (2006.01)
*G06F 1/16*    (2006.01)
*G02B 5/30*    (2006.01)

(52) U.S. Cl.
CPC ............. *G02B 13/003* (2013.01); *G02B 9/04* (2013.01); *G06F 1/163* (2013.01); *G02B 5/3025* (2013.01); *G02B 5/3083* (2013.01); *G02B 13/009* (2013.01)

(58) Field of Classification Search
CPC ...... G02B 5/3025; G02B 5/3083; G02B 9/04; G02B 13/003; G02B 13/0065; G02B 13/009; G02F 1/163
See application file for complete search history.

*Primary Examiner* — Jack Dinh
(74) *Attorney, Agent, or Firm* — Bruce Stone LLP; Joseph A. Bruce

(57) ABSTRACT

An optical lens assembly includes, in order from a visual side to an image source side: a first group including a first lens group and an optical element, and the optical element including, in order from the visual side to the image source side: an absorptive polarizer, a reflective polarizer and a first phase retarder; a second group including, in order from the visual side to the image source side: a second lens group with positive refractive power and a partial-reflective-partial-transmissive element; and a third group including, in order from the visual side to the image source side: a second phase retarder and an image source plane. When the optical lens assembly satisfies certain conditions, the weight of the device can be reduced, the zooming function can be provided, and the image quality can be ensured.

20 Claims, 10 Drawing Sheets

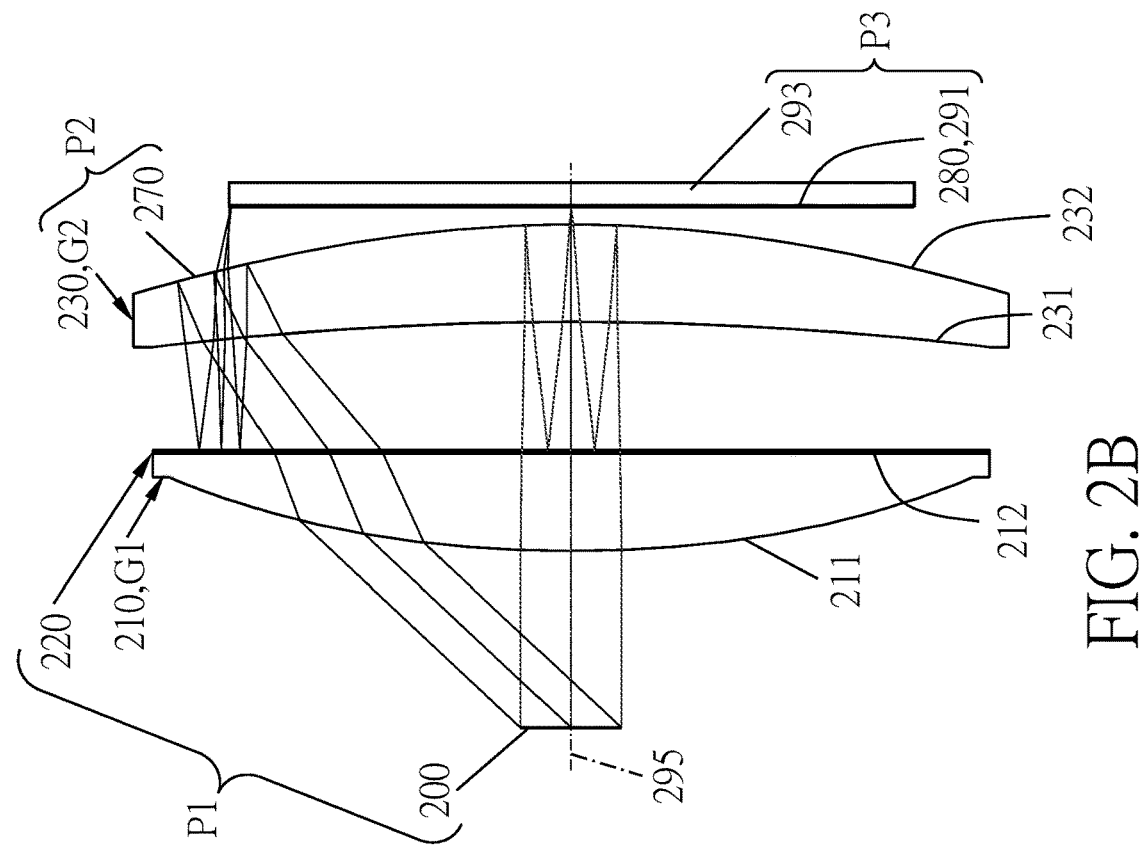
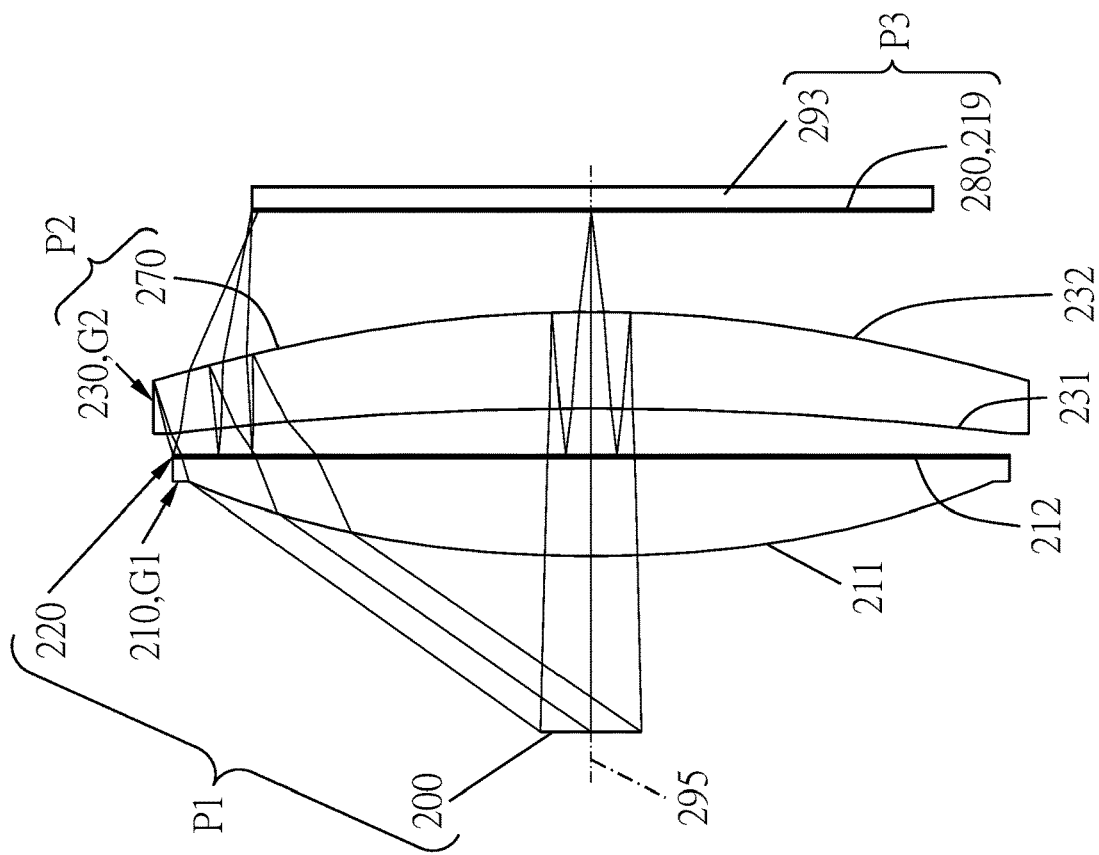
FIG. 2A
FIG. 2B

OPTICAL LENS ASSEMBLY AND A HEAD-MOUNTED ELECTRONIC DEVICE

BACKGROUND

Field of the Invention

The present invention relates to an optical lens assembly and a head-mounted electronic device, and more particularly to an optical lens assembly applicable to head-mounted electronic devices.

Description of Related Art

With the development of the semiconductor industry, the functions of various consumer electronic products are increasingly powerful. Moreover, various services of the software application end emerge. These enables consumers to have more choices. Head-mounted displays come into being when the market is no longer satisfied with handheld electronic products. However, the current head-mounted displays are heavy and have poor image quality.

In addition, existing head-mounted displays are all fixed-focus designs, so users with myopia or hyperopia need to additionally wear their own glasses when using the head-mounted displays. This affects the wearing comfort of head-mounted displays and the experiences in the performance of the head-mounted displays.

The present invention mitigates and/or obviates the aforementioned disadvantages.

SUMMARY

The objective of the present invention is to provide an optical lens assembly and a head-mounted electronic device, which can reduce the weight of the device by folding the light path, provide a zooming function, allow users to use the device without additionally wearing their glasses, and ensure the image quality.

Therefore, an optical lens assembly in accordance with the present invention includes three groups including, in order from a visual side to an image source side: a first group including: a first lens group including one, two, or three lenses, and a visual-side surface of the lens of the first lens group which is closest to the visual side, being convex in a paraxial region thereof; and an optical element including, in order from the visual side to the image source side: an absorptive polarizer, a reflective polarizer and a first phase retarder; a second group including, in order from the visual side to the image source side: a second lens group with positive refractive power, including one, two, or three lenses, and an image source-side surface of the lens of the second lens group which is closest to the image source side, being convex in a paraxial region thereof; and a partial-reflective-partial-transmissive element; and a third group including, in order from the visual side to the image source side: a second phase retarder and an image source plane.

For the optical lens assembly, a focal length of the first lens group is f_G1, a focal length of the second lens group is f_G2, a focal length of the optical lens assembly focusing at a near point is EFL_N, a focal length of the optical lens assembly focusing at a far point is EFL_F, a distance from the visual-side surface of the lens of the first lens group which is closest to the visual side, to the image source plane along the optical axis is TL, a maximum image-source height of the optical lens assembly is IMH, and the following conditions are satisfied: $-0.48 < f\_G2/f\_G1 < 2.15$ and $0.51 < EFL\_N*TL/(EFL\_F*IMH) < 1.56$. When f_G2/f_G1 is satisfied, the distribution of the refractive power of the optical lens assembly will be more appropriate, and the aberration can be reduced. When $EFL\_N*TL/(EFL\_F*IMH)$ is satisfied, a proper balance between the miniaturization of the optical lens assembly and the size of the light-emitting area of a display in the zoom range can be achieved.

Optionally, the optical lens assembly has a total of two, three or four lenses with refractive power.

A distance from an image source-side surface of the lens of the first lens group which is closest to the image source side, to the image source plane along the optical axis is MS2, the focal length of the optical lens assembly focusing at the far point is EFL_F, and the following condition is satisfied: $0.27 < MS2/EFL\_F < 0.92$, which can distribute the lengths of the elements of the optical lens assembly reasonably and reduce the sensitivity to the assembly tolerance.

A distance from the image source-side surface of the lens of the first lens group which is closest to the image source side, to a visual-side surface of the lens of the second lens group which is closest to the visual side, along the optical axis when the optical lens assembly focuses at the far point, is T12_F, a distance from the image source-side surface of the lens of the first lens group which is closest to the image source side, to the visual-side surface of the lens of the second lens group which is closest to the visual side, along the optical axis when the optical lens assembly focuses at the near point, is T12_N, the focal length of the optical lens assembly focusing at the near point is EFL_N, and the following condition is satisfied: $0.06 < (T12\_F - T12\_N)/EFL\_N < 0.50$, which can ensure an optimal balance between the performance and the miniaturization of the optical lens assembly in the zoom range.

A distance from the visual-side surface of the lens of the first lens group which is closest to the visual side, to the image source-side surface of the lens of the first lens group which is closest to the image source side, along the optical axis is GCT1, the distance from the image source-side surface of the lens of the first lens group which is closest to the image source side, to the image source plane along the optical axis is MS2, and the following condition is satisfied: $0.11 < GCT1/MS2 < 1.19$, which is favorable to achieving a proper balance between the lens formability and the refractive power of the first lens group.

The focal length of the second lens group is f_G2, a distance from the visual-side surface of the lens of the second lens group which is closest to the visual side, to the image source plane along the optical axis when the optical lens assembly focuses at the near point, is MS3_N, a distance from the visual-side surface of the lens of the second lens group which is closest to the visual side, to the image source plane along the optical axis when the optical lens assembly focuses at the far point, is MS3_F, and the following condition is satisfied: $0.38 \text{ mm}^{-1} < f\_G2/(MS3\_N*MS3\_F) < 3.06 \text{ mm}^{-1}$, which can ensure an optimal balance between the lens formability and the miniaturization of the optical lens assembly in the zoom range.

The distance from the visual-side surface of the lens of the second lens group which is closest to the visual side, to the image source plane along the optical axis when the optical lens assembly focuses at the far point, is MS3_F, the focal length of the first lens group is f_G1, and the following condition is satisfied: $-0.04 < MS3\_F/f\_G1 < 0.10$, which is favorable to achieving a proper balance between the lens formability and the refractive power of the first lens group.

The distance from the visual-side surface of the lens of the second lens group which is closest to the visual side, to the image source plane along the optical axis when the optical lens assembly focuses at the near point, is MS3_N, a distance from the visual-side surface of the lens of the second lens group which is closest to the visual side, to the image source-side surface of the lens of the second lens group which is closest to the image source side, along the optical axis is GCT2, and the following condition is satisfied: 0.78<MS3_N/GCT2<3.98, which is favorable to increasing the zoom range of the optical lens assembly.

A radius of curvature of the visual-side surface of the lens of the first lens group which is closest to the visual side is R1, the focal length of the optical lens assembly focusing at the near point is EFL_N, the focal length of the optical lens assembly focusing at the far point is EFL_F, and the following condition is satisfied: 0.06 mm$^{-1}$<R1/(EFL_N*EFL_F)<1.48 mm$^{-1}$, which can effectively reduce the distortion of the optical lens assembly when the focus of the optical lens assembly changes.

The focal length of the optical lens assembly focusing at the far point is EFL_F, the radius of curvature of the visual-side surface of the lens of the first lens group which is closest to the visual side is R1, and the following condition is satisfied: 0.02<EFL_F/R1<0.45, which is conducive to effectively improving the distortion of the optical lens assembly, reducing the aberration of the optical lens assembly, and reducing the size of the lens.

The distance from the visual-side surface of the lens of the first lens group which is closest to the visual side, to the image source plane along the optical axis is TL, the focal length of the optical lens assembly focusing at the near point is EFL_N, and the following condition is satisfied: 0.43<TL/EFL_N<1.35, which can maintain suitable lens formability and an appropriate length of the optical lens assembly.

The distance from the visual-side surface of the lens of the first lens group which is closest to the visual side, to the image source-side surface of the lens of the first lens group which is closest to the image source side, along the optical axis is GCT1, the distance from the visual-side surface of the lens of the second lens group which is closest to the visual side, to the image source-side surface of the lens of the second lens group which is closest to the image source side, along the optical axis is GCT2, and the following condition is satisfied: 0.45<GCT2/GCT1<4.64, which ensures that the thickness of the optical lens assembly can meet the processing requirement of the manufacturing process of the lens device while satisfying the image quality.

A radius of curvature of the visual-side surface of the lens of the second lens group which is closest to the visual side is R3, a radius of curvature of the image source-side surface of the lens of the second lens group which is closest to the image source side is R4, and the following condition is satisfied: −0.83<R4/R3<0.54, so that these two radii of curvature can restrict each other to prevent the radii of curvature from being too small and reduce the sensitivity to the assembly tolerance.

The distance from the image source-side surface of the lens of the first lens group which is closest to the image source side, to the image source plane along the optical axis is MS2, the focal length of the second lens group is f_G2, and the following condition is satisfied: 0.04<MS2/f_G2<0.18, which is favorable to achieving a proper balance between the spatial size of the two lens groups and the refractive power of the second lens group.

A maximum field of view of the optical lens assembly focusing at the far point is FOV_F, the distance from the image source-side surface of the lens of the first lens group which is closest to the image source side, to the visual-side surface of the lens of the second lens group which is closest to the visual side, along the optical axis when the optical lens assembly focuses at the far point, is T12_F, the maximum image-source height of the optical lens assembly is IMH, and the following condition is satisfied: 0.18<FOV_F/(T12_F*IMH)<3.18, which can meet the needs of light-weight while achieving a better sense of immersion by fitting the field of view of the human eyes.

Optionally, the first group remains motionless during zooming.

Optionally, the optical element is located on an image source-side surface of the lens of the first lens group which is closest to the visual side.

Optionally, the third group remains motionless during zooming.

Optionally, the second group moves from the image source side to the visual side in zooming from the near point to the far point.

Optionally, the focal length of the first lens group is f_G1, and the following condition is satisfied: −560.00 mm<f_G1<8141.41 mm.

Optionally, the focal length of the second lens group is f_G2, and the following condition is satisfied: 56.78 mm<f_G2<432.03 mm.

Optionally, the distance from the visual-side surface of the lens of the second lens group which is closest to the visual side, to the image source plane along the optical axis when the optical lens assembly focuses at the near point, is MS3_N, and the following condition is satisfied: 6.43 mm<MS3_N<27.92 mm.

Optionally, the distance from the visual-side surface of the lens of the second lens group which is closest to the visual side, to the image source plane along the optical axis when the optical lens assembly focuses at the far point is MS3_F, and the following condition is satisfied: 4.80 mm<MS3_F<19.95 mm.

Optionally, the distance from the visual-side surface of the lens of the first lens group which is closest to the visual side, to the image source plane along the optical axis is TL, and the following condition is satisfied: 9.70 mm<TL<38.18 mm.

Optionally, the maximum image-source height of the optical lens assembly is IMH, and the following condition is satisfied: 8.08 mm<IMH<37.72 mm.

A head-mounted electronic device includes a housing, an optical lens assembly disposed in the housing, an image source disposed on an image source plane of the optical lens assembly in the housing, and a controller disposed in the housing and electrically connected to the image source. The optical lens assembly includes three groups including, in order from a visual side to an image source side: a first group including a first lens group including one, two, or three lenses, and a visual-side surface of the lens of the first lens group which is closest to the visual side, being convex in a paraxial region thereof; and an optical element including, in order from the visual side to the image source side: an absorptive polarizer, a reflective polarizer and a first phase retarder; a second group including, in order from the visual side to the image source side: a second lens group with positive refractive power, including one, two, or three lenses, and an image source-side surface of the lens of the second lens group which is closest to the image source side, being convex in a paraxial region thereof; and a partial-reflective-partial-transmissive element; and a third group including, in order from the visual side to the image source side: a second phase retarder and an image source plane.

For the optical lens assembly, a focal length of the first lens group is f_G1, a focal length of the second lens group is f_G2, a focal length of the optical lens assembly focusing at a near point is EFL_N, a focal length of the optical lens assembly focusing at a far point is EFL_F, a distance from the visual-side surface of the lens of the first lens group which is closest to the visual side, to the image source plane along the optical axis is TL, a maximum image-source height of the optical lens assembly is IMH, and the following conditions are satisfied: −0.48<f_G2/f_G1<2.15 and 0.51<EFL_N*TL/(EFL_F*IMH)<1.56. When f_G2/f_G1 is satisfied, the distribution of the refractive power of the optical lens assembly will be more appropriate, and the aberration can be reduced. When EFL_N*TL/(EFL_F*IMH) is satisfied, a proper balance between the miniaturization of the optical lens assembly and the size of the light-emitting area of a display in the zoom range can be achieved.

Optionally, the optical lens assembly has a total of two, three or four lenses with refractive power.

A distance from an image source-side surface of the lens of the first lens group which is closest to the image source side, to the image source plane along the optical axis is MS2, the focal length of the optical lens assembly focusing at the far point is EFL_F, and the following condition is satisfied: 0.27<MS2/EFL_F<0.92, which can distribute the lengths of the elements of the optical lens assembly reasonably and reduce the sensitivity to the assembly tolerance.

A distance from the image source-side surface of the lens of the first lens group which is closest to the image source side, to a visual-side surface of a lens of the second lens group which is closest to the visual side, along the optical axis when the optical lens assembly focuses at the far point, is T12_F, a distance from the image source-side surface of the lens of the first lens group which is closest to the image source side, to the visual-side surface of the lens of the second lens group which is closest to the visual side, along the optical axis when the optical lens assembly focuses at the near point, is T12_N, the focal length of the optical lens assembly focusing at the near point is EFL_N, and the following condition is satisfied: 0.06<(T12_F−T12_N)/EFL_N<0.50, which can ensure an optimal balance between the performance and the miniaturization of the optical lens assembly in the zoom range.

A distance from the visual-side surface of the lens of the first lens group which is closest to the visual side, to the image source-side surface of the lens of the first lens group which is closest to the image source side, along the optical axis is GCT1, the distance from the image source-side surface of the lens of the first lens group which is closest to the image source side, to the image source plane along the optical axis is MS2, and the following condition is satisfied: 0.11<GCT1/MS2<1.19, which is favorable to achieving a proper balance between the lens formability and the refractive power of the first lens group.

The focal length of the second lens group is f_G2, a distance from the visual-side surface of the lens of the second lens group which is closest to the visual side, to the image source plane along the optical axis when the optical lens assembly focuses at the near point, is MS3_N, a distance from the visual-side surface of the lens of the second lens group which is closest to the visual side, to the image source plane along the optical axis when the optical lens assembly focuses at the far point, is MS3_F, and the following condition is satisfied: 0.38 mm$^{-1}$<f_G2/(MS3_N*MS3_F)<3.06 mm$^{-1}$, which can ensure an optimal balance between the lens formability and the miniaturization of the optical lens assembly in the zoom range.

The distance from the visual-side surface of the lens of the second lens group which is closest to the visual side, to the image source plane along the optical axis when the optical lens assembly focuses at the far point, is MS3_F, the focal length of the first lens group is f_G1, and the following condition is satisfied: −0.04<MS3_F/f_G1<0.10, which is favorable to achieving a proper balance between the lens formability and the refractive power of the first lens group.

The distance from the visual-side surface of the lens of the second lens group which is closest to the visual side, to the image source plane along the optical axis when the optical lens assembly focuses at the near point, is MS3_N, a distance from the visual-side surface of the lens of the second lens group which is closest to the visual side, to the image source-side surface of the lens of the second lens group which is closest to the image source side, along the optical axis is GCT2, and the following condition is satisfied: 0.78<MS3_N/GCT2<3.98, which is favorable to increasing the zoom range of the optical lens assembly.

A radius of curvature of the visual-side surface of the lens of the first lens group which is closest to the visual side is R1, the focal length of the optical lens assembly focusing at the near point is EFL_N, the focal length of the optical lens assembly focusing at the far point is EFL_F, and the following condition is satisfied: 0.06 mm$^{-1}$<R1/(EFL_N*EFL_F)<1.48 mm$^{-1}$, which can effectively reduce the distortion of the optical lens assembly when the focus of the optical lens assembly changes.

The focal length of the optical lens assembly focusing at the far point is EFL_F, the radius of curvature of the visual-side surface of the lens of the first lens group which is closest to the visual side is R1, and the following condition is satisfied: 0.02<EFL_F/R1<0.45, which can effectively improve the distortion of the optical lens assembly, reduce the aberration of the optical lens assembly, and reduce the size of the lens.

The distance from the visual-side surface of the lens of the first lens group which is closest to the visual side, to the image source plane along the optical axis is TL, the focal length of the optical lens assembly focusing at the near point is EFL_N, and the following condition is satisfied: 0.43<TL/EFL_N<1.35, which can maintain suitable lens formability and an appropriate length of the optical lens assembly.

The distance from the visual-side surface of the lens of the first lens group which is closest to the visual side, to the image source-side surface of the lens of the first lens group which is closest to the image source side, along the optical axis is GCT1, the distance from the visual-side surface of the lens of the second lens group which is closest to the visual side, to the image source-side surface of the lens of the second lens group which is closest to the image source side, along the optical axis is GCT2, and the following condition is satisfied: 0.45<GCT2/GCT1<4.64, which ensures that the thickness of the lens device can meet the processing requirement of the manufacturing process of the lens device while satisfying the image quality.

A radius of curvature of the visual-side surface of the lens of the second lens group which is closest to the visual side is R3, a radius of curvature of the image source-side surface of the lens of the second lens group which is closest to the image source side is R4, and the following condition is satisfied: −0.83<R4/R3<0.54, so that these two radii of curvature can restrict each other to prevent the radii of curvature from being too small and reduce the sensitivity to the assembly tolerance.

The distance from the image source-side surface of the lens of the first lens group which is closest to the image source side, to the image source plane along the optical axis is MS2, the focal length of the second lens group is f_G2, and the following condition is satisfied: 0.04<MS2/f_G2<0.18, which is favorable to achieving a proper balance between the spatial size of the two lens groups and the refractive power of the second lens group.

A maximum field of view of the optical lens assembly focusing at the far point is FOV_F, the distance from the image source-side surface of the lens of the first lens group which is closest to the image source side, to the visual-side surface of the lens of the second lens group which is closest to the visual side, along the optical axis when the optical lens assembly focuses at the far point, is T12_F, the maximum image-source height of the optical lens assembly is IMH, and the following condition is satisfied: 0.18<FOV_F/(T12_F*IMH)<3.18, which can meet the needs of light-weight while achieving a better sense of immersion by fitting the field of view of the human eyes.

Optionally, the first group remains motionless during zooming.

Optionally, the optical element is located on an image source-side surface of the lens of the first lens group which is closest to the visual side.

Optionally, the third group remains motionless during zooming.

Optionally, the second group moves from the image source side to the visual side in zooming from the near point to the far point.

Optionally, the focal length of the first lens group is f_G1, and the following condition is satisfied: −560.00 mm<f_G1<8141.41 mm.

Optionally, the focal length of the second lens group is f_G2, and the following condition is satisfied: 56.78 mm<f_G2<432.03 mm.

Optionally, the distance from the visual-side surface of the lens of the second lens group which is closest to the visual side, to the image source plane along the optical axis when the optical lens assembly focuses at the near point, is MS3_N, and the following condition is satisfied: 6.43 mm<MS3_N<27.92 mm.

Optionally, the distance from the visual-side surface of the lens of the second lens group which is closest to the visual side, to the image source plane along the optical axis when the optical lens assembly focuses at the far point, is MS3_F, and the following condition is satisfied: 4.80 mm<MS3_F<19.95 mm.

Optionally, the distance from the visual-side surface of the lens of the first lens group which is closest to the visual side, to the image source plane along the optical axis is TL, and the following condition is satisfied: 9.70 mm<TL<38.18 mm.

Optionally, the maximum image-source height of the optical lens assembly is IMH, and the following condition is satisfied: 8.08 mm<IMH<37.72 mm.

The present invention will be presented in further details from the following descriptions with the accompanying drawings, which show, for purpose of illustrations only, the preferred embodiments in accordance with the present invention.

BRIEF DESCRIPTION OF THE DRAWINGS

FIG. 2A shows an optical lens assembly focusing at a near point in accordance with a second embodiment of the present invention;

FIG. 2B shows the optical lens assembly focusing at a far point in accordance with the second embodiment of the present invention;

DETAILED DESCRIPTION

First Embodiment

Figure 1A:
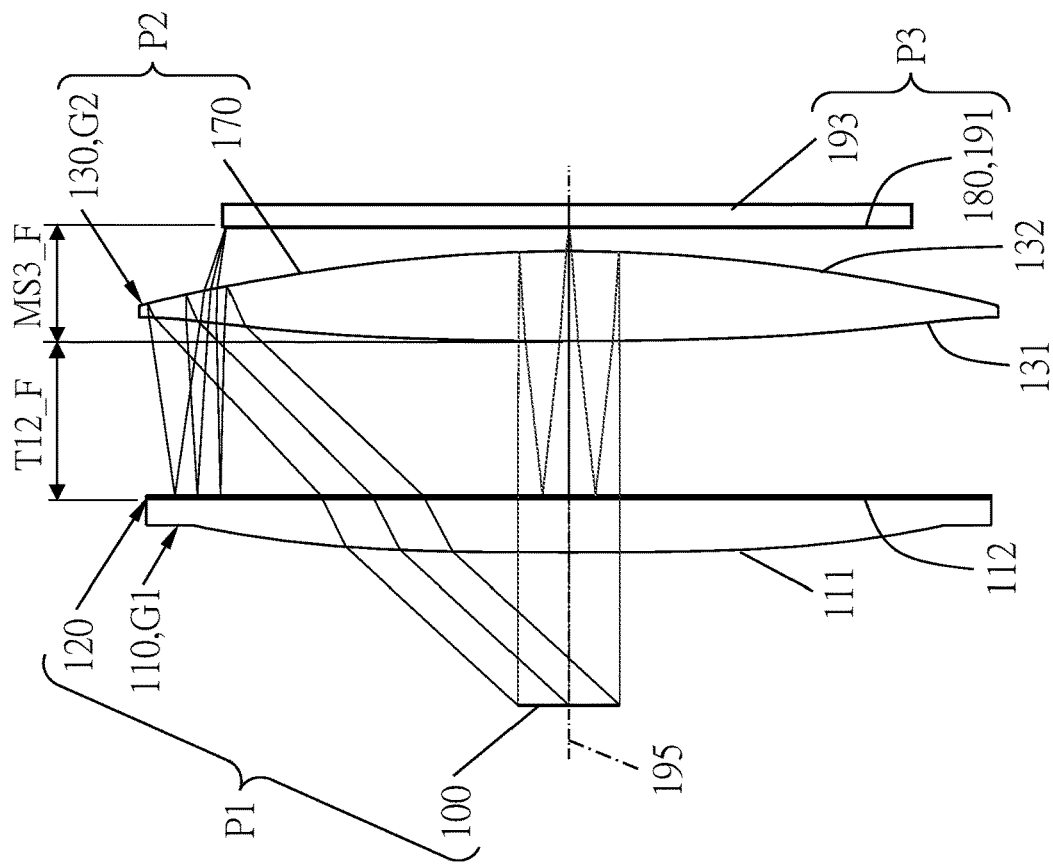
FIG. 1A shows an optical lens assembly focusing at a near point in accordance with a first embodiment of the present invention.
Figure 1B:
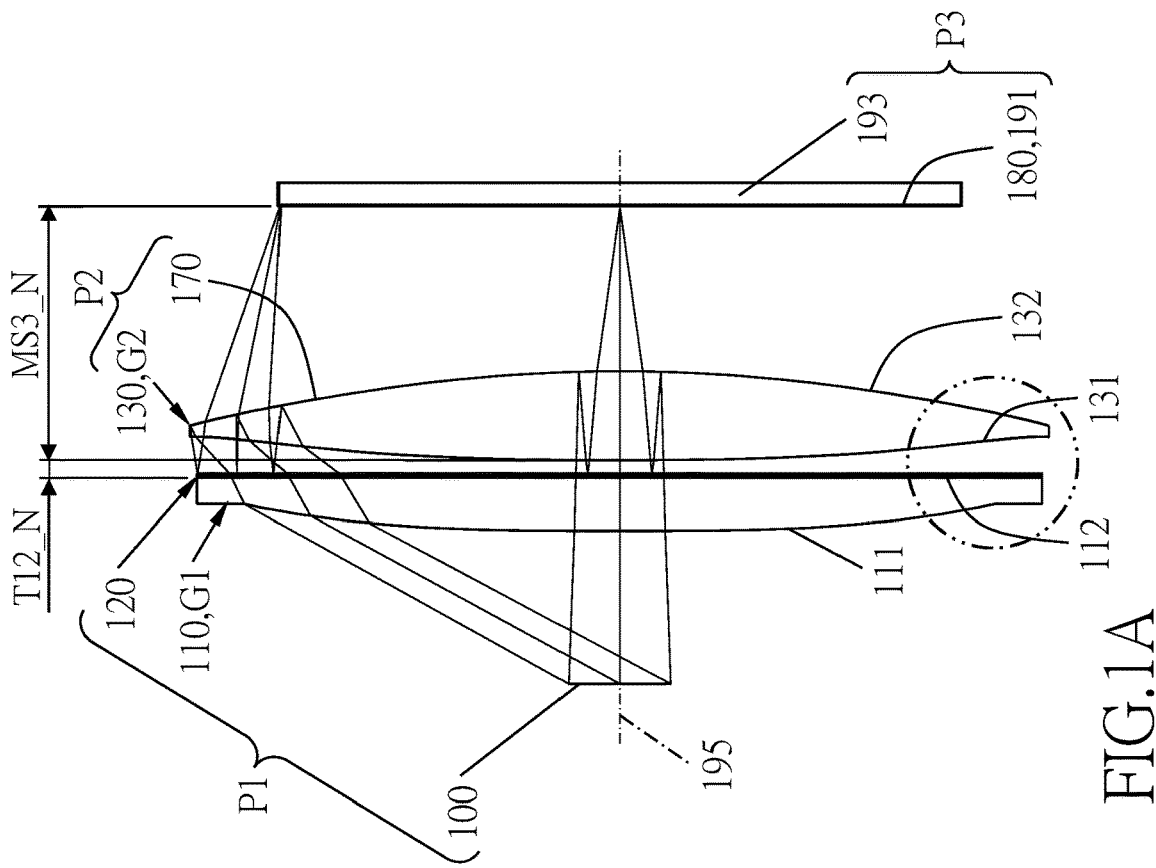
FIG. 1B shows the optical lens assembly focusing at a far point in accordance with the first embodiment of the present invention.
Figure 1D:
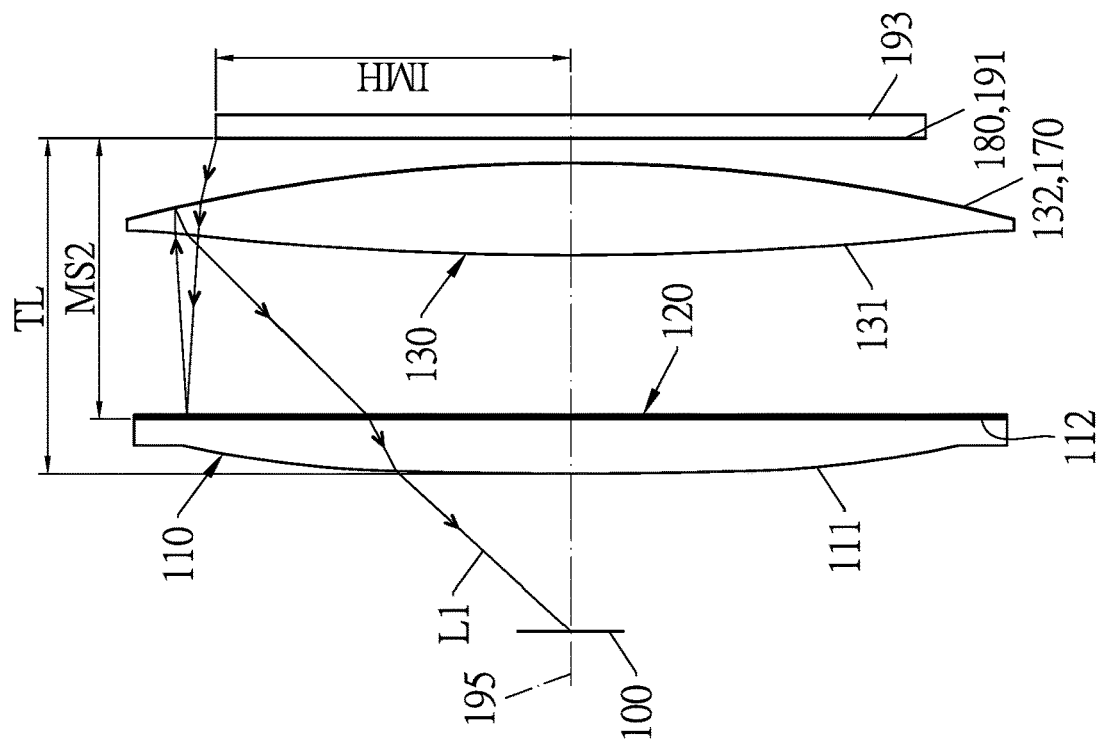
FIG. 1D shows parameters and a light path in accordance with the first embodiment of the present invention.
Figure 1C:
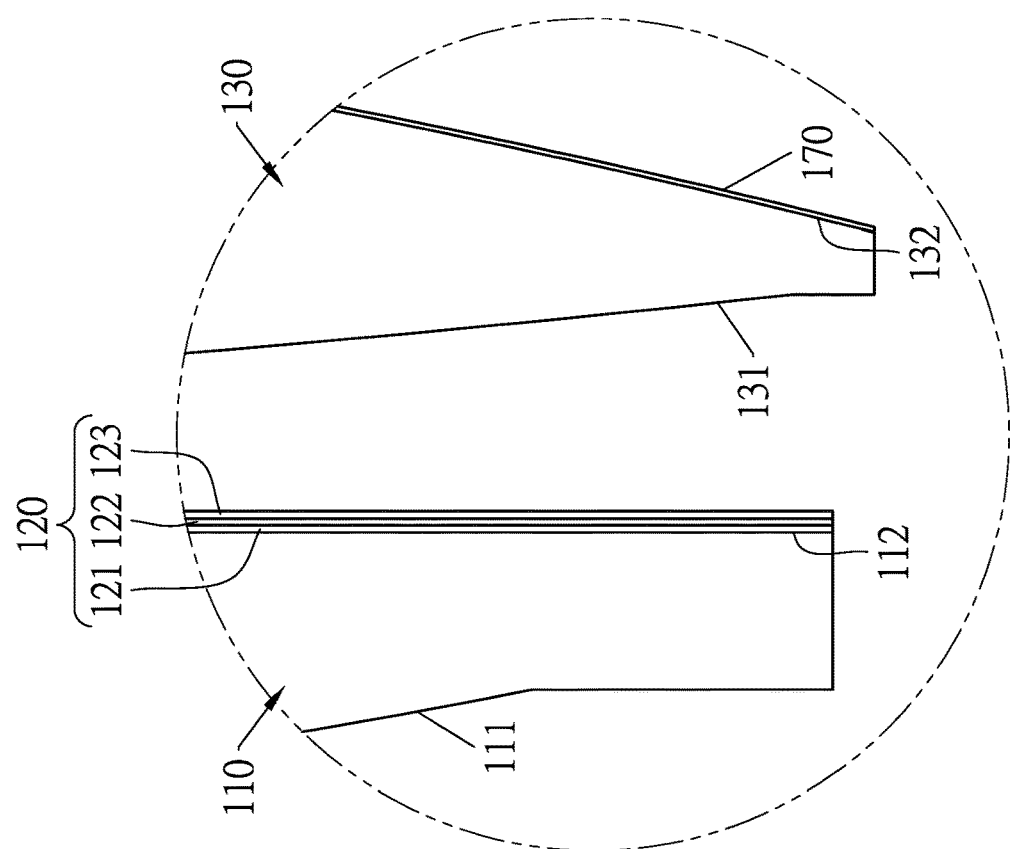
FIG. 1C shows a partial enlarged view of FIG. 1A.

Referring to FIGS. 1A-1D, FIG. 1A shows an optical lens assembly focusing at a near point in accordance with a first embodiment of the present invention, FIG. 1B shows the optical lens assembly focusing at a far point in accordance with the first embodiment of the present invention, FIG. 1C shows a partial enlarged view of FIG. 1A, and FIG. 1D shows the parameters and a light path of the first embodiment of the present invention. The optical lens assembly includes, in order from a visual side to an image source side along an optical axis 195: a first group P1, a second group P2 and a third group P3. During focusing (or zooming)

process, the second group P2 is movable relative to the first group P1 along the optical axis 195 between the first group P1 and the third group P3.

The first group P1 includes a stop 100, a first lens group G1 (that is, a first lens 110) and an optical element 120. The stop 100 may be at where the user's eyes view the virtual image. The first lens 110 is located between the stop 100 and the optical element 120. The second group P2 includes, in order from the visual side to the image source side: a second lens group G2 (that is, a second lens 130) with positive refractive power and a partial-reflective-partial-transmissive element 170. The third group P3 includes, in order from the visual side to the image source side: a second phase retarder 180 and an image source plane 191. The optical lens assembly has a total of two lenses with refractive power, but is not limited thereto. The optical lens assembly works in cooperation with an image source 193. The image source plane 191 can be located at the image source 193. The type of the image source 193 may be a liquid crystal display, an OLED display, or a LED display, but is not limited thereto.

The first lens 110 with positive refractive power includes a visual-side surface 111 and an image source-side surface 112, the visual-side surface 111 of the first lens 110 is convex in a paraxial region thereof, the image source-side surface 112 of the first lens 110 is flat in a paraxial region thereof, and the visual-side surface 111 of the first lens 110 is aspheric.

The optical element 120 includes, in order from the visual side to the image source side, an absorptive polarizer 121, a reflective polarizer 122 and a first phase retarder 123. These three elements may be stacked (for example, but not limited to, by film stickers) on the image source-side surface 112 of the first lens 110, and the opposite two surfaces of each of these three elements are flat. Specifically, the absorptive polarizer 121 is attached on the image source-side surface 112, the reflective polarizer 122 is attached on the absorptive polarizer 121, and the first phase retarder 123 is attached on the reflective polarizer 122. The first phase retarder 123 is, for example, but not limited to, a quarter-wave plate.

The second lens 130 with positive refractive power includes a visual-side surface 131 and an image source-side surface 132, the visual-side surface 131 of the second lens 130 is convex in a paraxial region thereof, the image source-side surface 132 of the second lens 130 is convex in a paraxial region thereof, and the visual-side surface 131 and the image source-side surface 132 of the second lens 130 are aspheric.

The partial-reflective-partial-transmissive element 170 is disposed (for example, but not limited to, by coating) on the image source-side surface 132 of the second lens 130 and has an average light reflectance of at least 30%, preferably 50%, in the visible light range. The average light reflectance here is an average value of different reflectance of the partial-reflective-partial-transmissive element 170 for different wavelengths.

The second phase retarder 180 is disposed between the partial-reflective-partial-transmissive element 170 and the image source plane 191 and is closer to the image source plane 191. The second phase retarder 180 is, for example, but not limited to, a quarter-wave plate.

The equation for the aspheric surface profiles of the respective lenses of the first embodiment is expressed as follows:

$$z(h) = \frac{ch^2}{1+[1-(k+1)c^2h^2]^{0.5}} + \sum(A_i) \cdot (h^i)$$

wherein:
z represents the value of a reference position at a height of h with respect to a vertex of the surface of a lens along the optical axis 195;
c represents a paraxial curvature equal to 1/R (R: a paraxial radius of curvature);
h represents a vertical distance from the point on the curve of the aspheric surface to the optical axis 195;
k represents the conic constant; and
$A_i$ represents the ith-order aspheric coefficient.

A focal length of the optical lens assembly focusing at the near point is EFL_N, a focal length of the optical lens assembly focusing at the far point is EFL_F, a focal length of the first lens group G1 is f_G1, a focal length of the second lens group G2 is f_G2, a distance from an image source-side surface (that is, the image source-side surface 112 of the first lens 110) of the lens of the first lens group which is closest to the image source side, to a visual-side surface (that is, the visual-side surface 131 of the second lens 130) of the lens of the second lens group which is closest to the visual side, along the optical axis 195 when the optical lens assembly focuses at the near point, is T12_N, a distance from the image source-side surface (that is, the image source-side surface 112 of the first lens 110) of the lens of the first lens group which is closest to the image source side, to the visual-side surface (that is, the visual-side surface 131 of the second lens 130) of the lens of the second lens group which is closest to the visual side, along the optical axis 195 when the optical lens assembly focuses at the far point, is T12_F, a maximum field of view of the optical lens assembly focusing at the near point is FOV_N, a maximum field of view of the optical lens assembly focusing at the far point is FOV_F, a distance from a visual-side surface (that is, the visual-side surface 111 of the first lens 110) of the lens of the first lens group G1 which is closest to the visual side, to the image source-side surface (that is, the image source-side surface 112 of the first lens 110) of the lens of the first lens group G1 which is closest to the image source side, along the optical axis 195 is GCT1, a distance from the visual-side surface (that is, the visual-side surface 131 of the second lens 130) of the lens of the second lens group G2 which is closest to the visual side, to an image source-side surface (that is, the image source-side surface 132 of the second lens 130) of the lens of the second lens group G2 which is closest to the image source side, along the optical axis 195 is GCT2, a distance from the visual-side surface (that is, the visual-side surface 131 of the second lens 130) of the lens of the second lens group G2 which is closest to the visual side, to the image source plane 191 along the optical axis 195 when the optical lens assembly focuses at the near point, is MS3_N, a distance from the visual-side surface (that is, the visual-side surface 131 of the second lens 130) of the lens of the second lens group G2 which is closest to the visual side, to the image source plane 191 along the optical axis 195 when the optical lens assembly focuses at the far point, is MS3_F, a distance from the image source-side surface (that is, the image source-side surface 112 of the first lens 110) of the lens of the first lens group G1 which is closest to the image source side, to the image source plane 191 along the optical axis 195 is MS2, a radius of curvature of the visual-side surface (that is, the visual-side surface 111 of the first lens 110) of the lens of the first lens group G1 which is closest to the visual side is R1, a radius of curvature of the image source-side surface (that is, the image source-side surface 112 of the first lens 110) of the lens of the first lens group G1 which is closest to the image source side is R2, a radius of curvature of the visual-side surface (that is, the visual-side surface 131 of the second lens 130) of the lens of the second lens group G2 which is closest to the visual side is R3, a radius of curvature of the image source-side surface (that is, the image source-side surface 132 of the second lens 130) of the lens of the second lens group G2 which is closest to the image source side is R4, a distance from the visual-side surface (that is, the visual-side surface 111 of the first lens 110) of the lens of the first lens group G1 which is closest to the visual side, to the image source plane 191 along the optical axis 195 is TL, a maximum image-source height of the optical lens assembly is IMH (usually denotes the radius of the incircle of the image source plane 191), and the numerical values of these parameters are shown in Table 1.

TABLE 1

| EFL_N(mm) | 31.26 | MS3_N(mm) | 19.94 |
|---|---|---|---|
| EFL_F(mm) | 35.31 | MS3_F(mm) | 8.86 |
| F_G1(mm) | 2138.93 | MS2(mm) | 21.01 |
| F_G2(mm) | 175.91 | R1(mm) | 1167.38 |
| T12_N(mm) | 1.07 | R2(mm) | infinity |
| T12_F(mm) | 12.15 | R3(mm) | 449.81 |
| FOV_N(degrees) | 123.0 | R4(mm) | −121.39 |
| FOV_F(degrees) | 94.8 | TL(mm) | 25.48 |
| GCT1(mm) | 4.47 | IMH(mm) | 26.64 |
| GCT2(mm) | 7.01 | — | — |

As can be inferred from Table 1, the optical lens assembly meets the conditions in the following table 2:

TABLE 2

| f_G2/f_G1 | 0.08 | R1/(EFL_N * EFL_F)[mm$^{-1}$] | 1.06 |
|---|---|---|---|
| EFL_N * TL/(EFL_F * IMH) | 0.85 | EFL_F/R1 | 0.03 |
| MS2/EFL_F | 0.59 | TL/EFL_N | 0.82 |
| (T12_F − T12_N)/EFL_N | 0.35 | GCT2/GCT1 | 1.57 |
| GCT1/(MS2) | 0.21 | R4/R3 | −0.27 |
| f_G2/(MS3_N * MS3_F)[mm$^{-1}$] | 1.00 | MS2/f_G2 | 0.12 |
| MS3_F/f_G1 | 0.004 | FOV_F/(T12_F * IMH) | 0.29 |
| MS3_N/GCT2 | 2.84 | — | — |

In the first embodiment of the present optical lens assembly, the focal length of the first lens group is f_G1, the focal length of the second lens group is f_G2, and the following condition is satisfied: f_G2/f_G1=0.08.

In the first embodiment of the present optical lens assembly, the focal length of the optical lens assembly focusing at the near point is EFL_N, the focal length of the optical lens assembly focusing at the far point is EFL_F, the distance from the visual-side surface of the lens of the first lens group G1 which is closest to the visual side, to the image source plane 191 along the optical axis 195 is TL, the maximum image-source height of the optical lens assembly is IMH, and the following condition is satisfied: EFL_N*TL/(EFL_F*=0.85.

In the first embodiment of the present optical lens assembly, the distance from the image source-side surface of the lens of the first lens group G1 which is closest to the image source side, to the image source plane 191 along the optical axis 195 is MS2, the focal length of the optical lens assembly focusing at the far point is EFL_F, and the following condition is satisfied: MS2/EFL_F=0.59.

In the first embodiment of the present optical lens assembly, the distance from the image source-side surface of the lens of the first lens group which is closest to the image source side, to the visual-side surface of the lens of the second lens group which is closest to the visual side, along the optical axis 195 when the optical lens assembly focuses at the far point, is T12_F, the distance from the image source-side surface of the lens of the first lens group which is closest to the image source side, to the visual-side surface of the lens of the second lens group which is closest to the visual side along the optical axis 195 when the optical lens assembly focuses at the near point is T12_N, the focal length of the optical lens assembly focusing at the near point is EFL_N, and the following condition is satisfied: (T12_F−T12_N)/EFL_N=0.35.

In the first embodiment of the present optical lens assembly, the distance from the visual-side surface of the lens of the first lens group G1 which is closest to the visual side, to the image source-side surface of the lens of the first lens group G1 which is closest to the image source side, along the optical axis 195 is GCT1, the distance from the image source-side surface of the lens of the first lens group G1 which is closest to the image source side, to the image source plane 191 along the optical axis 195 is MS2, and the following condition is satisfied: GCT1/MS2=0.21.

In the first embodiment of the present optical lens assembly, the focal length of the second lens group is f_G2, the distance from the visual-side surface of the lens of the second lens group G2 which is closest to the visual side, to the image source plane 191 along the optical axis 195 when the optical lens assembly focuses at the near point is MS3_N, the distance from the visual-side surface of the lens of the second lens group G2 which is closest to the visual side, to the image source plane 191 along the optical axis 195 when the optical lens assembly focuses at the far point is MS3_F, and the following condition is satisfied: f_G2/(MS3_N*MS3_F)=1.00 mm$^{-1}$.

In the first embodiment of the present optical lens assembly, the distance from the visual-side surface of the lens of the second lens group G2 which is closest to the visual side, to the image source plane 191 along the optical axis 195 when the optical lens assembly focuses at the far point is MS3_F, the focal length of the first lens group is f_G1, and the following condition is satisfied: MS3_F/f_G1=0.004.

In the first embodiment of the present optical lens assembly, the distance from the visual-side surface of the lens of the second lens group G2 which is closest to the visual side, to the image source plane 191 along the optical axis 195 when the optical lens assembly focuses at the near point is MS3_N, the distance from the visual-side surface of the lens of the second lens group G2 which is closest to the visual side, to the image source-side surface of the lens of the second lens group G2 which is closest to the image source side, along the optical axis 195 is GCT2, and the following condition is satisfied: MS3_N/GCT2=2.84.

In the first embodiment of the present optical lens assembly, the radius of curvature of the visual-side surface of the lens of the first lens group G1 which is closest to the visual side is R1, the focal length of the optical lens assembly focusing at the near point is EFL_N, the focal length of the optical lens assembly focusing at the far point is EFL_F, and the following condition is satisfied: R1/(EFL_N*EFL_F)=1.06 mm$^{-1}$.

In the first embodiment of the present optical lens assembly, the focal length of the optical lens assembly focusing at the far point is EFL_F, the radius of curvature of the visual-side surface of the lens of the first lens group G1 which is closest to the visual side is R1, and the following condition is satisfied: EFL_F/R1=0.03.

In the first embodiment of the present optical lens assembly, the distance from the visual-side surface of the lens of the first lens group G1 which is closest to the visual side, to the image source plane 191 along the optical axis 195 is TL, the focal length of the optical lens assembly focusing at the near point is EFL_N, and the following condition is satisfied: TL/EFL_N=0.82.

In the first embodiment of the present optical lens assembly, the distance from the visual-side surface of the lens of the first lens group G1 which is closest to the visual side, to the image source-side surface of the lens of the first lens group G1 which is closest to the image source side, along the optical axis 195 is GCT1, the distance from the visual-side surface of the lens of the second lens group G2 which is closest to the visual side, to the image source-side surface of the lens of the second lens group G2 which is closest to the image source side, along the optical axis 195 is GCT2, and the following condition is satisfied: GCT2/GCT1=1.57.

In the first embodiment of the present optical lens assembly, the radius of curvature of the visual-side surface of the lens of the second lens group G2 which is closest to the visual side is R3, the radius of curvature of the image source-side surface of the lens of the second lens group G2 which is closest to the image source side is R4, and the following condition is satisfied: R4/R3=−0.27.

In the first embodiment of the present optical lens assembly, the distance from the image source-side surface of the lens of the first lens group G1 which is closest to the image source side, to the image source plane 191 along the optical axis 195 is MS2, the focal length of the second lens group is f_G2, and the following condition is satisfied: MS2/f_G2=0.12.

In the first embodiment of the present optical lens assembly, the maximum field of view of the optical lens assembly focusing at the far point is FOV_F, the distance from the image source-side surface of the lens of the first lens group which is closest to the image source side, to the visual-side surface of the lens of the second lens group which is closest to the visual side, along the optical axis 195 when the optical lens assembly focuses at the far point, is T12_F, the maximum image-source height of the optical lens assembly is IMH, and the following condition is satisfied: FOV_F/(T12_F*)=0.29.

Moreover, the optical lens assembly of the first embodiment utilizes the configuration and arrangement of the partial-reflective-partial-transmissive element, the absorptive polarizer, the reflective polarizer, the phase retarders and the lenses to fold the light path thereof by the transmission and reflection of light to shorten the length of the optical lens assembly required for imaging without affecting the image quality. Referring to FIG. 1D, the linearly-polarized incident light emitted by the image source 193 travels along a light path L1 to the eyes of the user. Specifically, the linearly-polarized incident light turns from the linearly polarized state to the circularly polarized state when passing through the second phase retarder 180, the circularly polarized incident light is split by the partial-reflective-partial-transmissive element 170 located on the image source-side surface of the lens of the second lens group G2 which is closest to the image source side, to have a transmitted light component that enters into the first group P1 upon passing through the partial-reflective-partial-transmissive element 170 and the second lens group G2. This transmitted light component traveling in the first group P1 turns from the circularly polarized state to the linearly polarized state to have a polarization direction parallel to the reflection axis of the reflective polarizer 122 when passing through the first phase retarder 123. This linearly-polarized transmitted light component is then reflected by the reflective polarizer 122 to pass through the first phase retarder 123 and return from the linearly polarized state to the circularly polarized state. Then, after the transmitted light component returning to the circularly polarized state passes through the second lens group G2 of the second group P2, a portion of the transmitted light component passing through the second lens group G2 of the second group P2 is reflected as a reflected light component by the partial-reflective-partial-transmissive element 170, and this reflected light component travels to the first group P1 after passing through the second lens group G2. The reflected light component traveling in the first group P1 turns from the circularly polarized state to the linearly polarized state to have a polarization direction perpendicular to the reflection axis of the reflective polarizer 122 when passing through the first phase retarder 123. Finally, the linearly-polarized reflected light component is refracted to the user's eyes by the lens of the first lens group G1 which is closer to the visual side than the absorptive polarizer 121, after passing through the reflective polarizer 122 and the absorptive polarizer 121.

The detailed optical data of the respective elements in the optical lens assembly of the first embodiment is shown in Table 3, and the aspheric surface data of the lenses in the first embodiment is shown in Table 4.

TABLE 3

Embodiment 1
Far point: EFL_F = 35.31 mm, EPD (entrance pupil diameter) = 8.00 mm, FOV_F = 94.8 degrees
Near point: EFL_N = 31.26 mm, EPD (entrance pupil diameter) = 8.00 mm, FOV_N = 123.0 degrees

| Surface | | Curvature Radius | Thickness/gap | | Refractive Index (nd) | Abbe number (vd) | Focal length |
|---|---|---|---|---|---|---|---|
| 0 | | infinity | −10000.000 | (Far point) | | | |
| | | | −111.000 | (Near point) | | | |
| 1 | Stop | infinity | 12.000 | | — | — | — |
| 2 | First lens | 1167.381 | 4.472 | | 1.544 | 55.9 | 2138.93 |
| 3 | Absorptive polarizer | infinity | 0.100 | | 1.533 | 56.0 | — |
| 4 | Reflective polarizer | infinity | 0.100 | | 1.533 | 56.0 | — |
| 5 | First phase retarder | infinity | 0.100 | | 1.533 | 56.0 | — |
| 6 | | infinity | 11.845 | (Far point) | — | — | — |
| | | | 0.767 | (Near point) | | | |

TABLE 3-continued

Embodiment 1
Far point: EFL_F = 35.31 mm, EPD (entrance pupil diameter) = 8.00 mm, FOV_F = 94.8 degrees
Near point: EFL_N = 31.26 mm, EPD (entrance pupil diameter) = 8.00 mm, FOV_N = 123.0 degrees

| Surface | | Curvature Radius | Thickness/gap | | Refractive Index (nd) | Abbe number (vd) | Focal length |
|---|---|---|---|---|---|---|---|
| 7 | Second lens | 449.808 | 7.012 | | 1.544 | 55.9 | — |
| 8 | Partial-reflective-partial-transmissive element | −121.388 | −7.012 | | mirror | | — |
| 9 | | 449.808 | −11.845 −0.767 | (Far point) (Near point) | — | — | — |
| 10 | First phase retarder | infinity | −0.100 | | 1.533 | 56.0 | — |
| 11 | Reflective polarizer | infinity | −0.100 | | 1.533 | 56.0 | — |
| 12 | | infinity | 0.100 | | mirror | | — |
| 13 | First phase retarder | infinity | 0.100 | | 1.533 | 56.0 | — |
| 14 | | infinity | 11.845 0.767 | (Far point) (Near point) | — | — | — |
| 15 | Second lens | 449.808 | 7.012 | | 1.544 | 55.9 | 175.91 |
| 16 | Partial-reflective-partial-transmissive element | −121.388 | 1.750 12.828 | (Far point) (Near point) | — | — | — |
| 17 | Second phase retarder | infinity | 0.100 | | 1.533 | 56.0 | — |
| 18 | Image source plane | infinity | — | | — | — | — |

Note:
the reference wavelength is 555 nm

TABLE 4

| Surface | 2 | 3 | 7  9  15 | 8  16 |
|---|---|---|---|---|
| K: | 9.0000E+01 | 0.0000E+00 | 0.0000E+00 | −3.8395E+00 |
| A4: | 3.0578E−06 | 0.0000E+00 | 1.2579E−06 | 8.0748E−08 |
| A6: | 1.7668E−09 | 0.0000E+00 | −1.9721E−10 | 3.8187E−10 |
| A8: | −7.8251E−12 | 0.0000E+00 | −1.9500E−13 | −2.1540E−13 |
| A10: | 7.2622E−16 | 0.0000E+00 | −8.1799E−17 | −7.8410E−18 |
| A12: | 2.1462E−17 | 0.0000E+00 | −3.0636E−20 | −1.8863E−20 |
| A14: | −2.7772E−20 | 0.0000E+00 | −2.8039E−23 | −2.3056E−23 |
| A16: | 1.0795E−23 | 0.0000E+00 | −5.4014E−26 | −1.8914E−26 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

In Table 3, the units of the radius of curvature, the thickness and the focal length are expressed in mm, and the surface numbers 18-0 respectively represent the surfaces where light travels to, from the image source plane 191 to the stop 100, wherein the surface 0 represents a gap between the user's eye (or stop 100) and a virtual image along the optical axis 195, and the imaging position is farther away from the visual side than the image source plane 191; the surface 1 represents a gap between the stop 100 and the first lens 110 along the optical axis 195; the surfaces 2, 3 and 17 represent the thicknesses of the first lens 110, the absorptive polarizer 121 and the second phase retarder 180 along the optical axis 195, respectively; the surfaces 4, 11 and 12 represent the thickness of the reflective polarizer 122 along the optical axis 195; the surfaces 5, 10 and 13 represent the thicknesses of the first phase retarder 123 along the optical axis 195; the surface 6 represents a gap between the first phase retarder 123 and the second lens 130 along the optical axis 195; the surfaces 7 and 15 represent the thickness of the second lens 130 along the optical axis 195; the surfaces 8 and 16 represent the thickness of the partial-reflective-partial-transmissive element 170 along the optical axis 195; the surface 9 represents a gap between the partial-reflective-partial-transmissive element 170 and the first phase retarder 123 along the optical axis 195; the surface 14 represents a gap between the first phase retarder 123 and the second lens 130 along the optical axis 195. The values of the parameters having a negative sign in the table represent light reflective transmission.

In table 4, k represents the conic constant of the equation of aspheric surface profiles, and A4, A6, A8, A10, A12, A14, A16, A18, and A20 represent the high-order aspheric coefficients.

The respective tables presented below for respective one of other embodiments are based on the schematic view of this embodiment, and the definitions of parameters in the tables are the same as those in Tables 1-4 of the first embodiment. Therefore, an explanation in this regard will not be provided again. Moreover, in each of the embodiments of the present invention, the maximum effective radius of either of surfaces of one lens is usually a vertical distance between an intersection of a ray, passing through the edge of the entrance pupil, in the incident light at a maximum view angle of the optical lens assembly and the surface of the lens and the optical axis, or is a radius of a part of the surface of the lens which is not subjected to any surface treatment (e.g., forming a concave and convex structure, or performing ink coating, etc. on the surface of the lens), or a radius of a light-transmissive part of the lens (as a shield or spacing ring, etc. blocks another part of the lens), but not limited thereto.

Second Embodiment

Referring to FIGS. 2A~2B, FIG. 2A shows an optical lens assembly focusing at a near point in accordance with a second embodiment of the present invention, and FIG. 2B shows the optical lens assembly focusing at a far point in accordance with the second embodiment of the present invention. The optical lens assembly includes, in order from a visual side to an image source side along an optical axis 295: a first group P1, a second group P2 and a third group P3. During focusing (or zooming) process, the second group P2 is movable relative to the first group P1 along the optical axis 295 between the first group P1 and the third group P3.

The first group P1 includes a stop 200, a first lens group G1 (that is, a first lens 210) and an optical element 220. The stop 200 may be at where the user's eyes view the virtual image. The first lens 210 is located between the stop 200 and the optical element 220. The second group P2 includes, in order from the visual side to the image source side: a second lens group G2 (that is, a second lens 230) with positive refractive power and a partial-reflective-partial-transmissive element 270. The third group P3 includes, in order from the visual side to the image source side: a second phase retarder 280 and an image source plane 291. The optical lens assembly has a total of two lenses with refractive power, but is not limited thereto. The optical lens assembly works in cooperation with an image source 293. The image source plane 291 can be located at the image source 293. The type of the image source 293 may be a liquid crystal display, an OLED display, or a LED display, but is not limited thereto.

The first lens 210 with positive refractive power includes a visual-side surface 211 and an image source-side surface 212, the visual-side surface 211 of the first lens 210 is convex in a paraxial region thereof, the image source-side surface 212 of the first lens 210 is flat in a paraxial region thereof, and the visual-side surface 211 of the first lens 210 is aspheric.

The optical element 220 includes, in order from the visual side to the image source side, an absorptive polarizer, a reflective polarizer and a first phase retarder. The configuration of the three elements may refer to that of the absorptive polarizer 121, the reflective polarizer 122 and the first phase retarder 123 of the first embodiment and will not be explained again.

The second lens 230 with positive refractive power includes a visual-side surface 231 and an image source-side surface 232, the visual-side surface 231 of the second lens 230 is concave in a paraxial region thereof, the image source-side surface 232 of the second lens 230 is convex in a paraxial region thereof, the visual-side surface 231 of the second lens 230 is spherical, and the image source-side surface 232 of the second lens 230 is aspheric.

The partial-reflective-partial-transmissive element 270 is disposed (for example, but not limited to, by coating) on the image source-side surface 232 of the second lens 230 and has an average light reflectance of at least 30%, preferably 50%, in the visible light range. The average light reflectance here is an average value of different reflectance of the partial-reflective-partial-transmissive element 270 for different wavelengths.

The second phase retarder 280 is disposed between the partial-reflective-partial-transmissive element 270 and the image source plane 291 and is closer to the image source plane 291. The second phase retarder 280 is, for example, but not limited to, a quarter-wave plate.

The detailed data of the second embodiment is shown in Tables 5-8.

TABLE 5

Embodiment 2
Far point: EFL_F = 35.54 mm, EPD (entrance pupil diameter) = 8.00 mm, FOV_F = 93.8 degrees
Near point: EFL_N = 33.09 mm, EPD (entrance pupil diameter) = 8.00 mm, FOV_N = 110.1 degrees

| Surface | | Curvature Radius | Thickness/gap | | Refractive Index (nd) | Abbe number (vd) | Focal length |
|---|---|---|---|---|---|---|---|
| 0 | | infinity | −10000.000 | (Far point) | — | — | — |
| | | | −167.000 | (Near point) | | | |
| 1 | Stop | infinity | 14.000 | | — | — | — |
| 2 | First lens | 109.759 | 8.000 | | 1.544 | 55.9 | 201.11 |
| 3 | Absorptive polarizer | infinity | 0.100 | | 1.533 | 56.0 | — |
| 4 | Reflective polarizer | infinity | 0.100 | | 1.533 | 56.0 | — |
| 5 | First phase retarder | infinity | 0.100 | | 1.533 | 56.0 | — |
| 6 | | infinity | 9.903 | (Far point) | — | — | — |
| | | | 3.391 | (Near point) | | | |
| 7 | Second lens | −274.000 | 7.667 | | 1.544 | 55.9 | — |
| 8 | Partial-reflective-partial-transmissive element | −105.338 | −7.667 | | mirror | | — |
| 9 | | −274.000 | −9.903 | (Far point) | — | — | — |
| | | | −3.391 | (Near point) | | | |
| 10 | First phase retarder | infinity | −0.100 | | 1.533 | 56.0 | — |
| 11 | Reflective polarizer | infinity | −0.100 | | 1.533 | 56.0 | — |
| 12 | | infinity | 0.100 | | mirror | | — |
| 13 | First phase retarder | infinity | 0.100 | | 1.533 | 56.0 | — |
| 14 | | infinity | 9.903 | (Far point) | — | — | — |
| | | | 3.391 | (Near point) | | | |
| 15 | Second lens | −274.000 | 7.667 | | 1.544 | 55.9 | 308.60 |
| 16 | | −105.338 | 1.300 | (Far point) | — | — | — |
| | | | 7.812 | (Near point) | | | |

TABLE 5-continued

Embodiment 2
Far point: EFL_F = 35.54 mm, EPD (entrance pupil diameter) = 8.00 mm, FOV_F = 93.8 degrees
Near point: EFL_N = 33.09 mm, EPD (entrance pupil diameter) = 8.00 mm, FOV_N = 110.1 degrees

| Surface | | Curvature Radius | Thickness/gap | Refractive Index (nd) | Abbe number (vd) | length Focal |
|---|---|---|---|---|---|---|
| 17 | Second phase retarder | infinity | 0.100 | 1.533 | 56.0 | — |
| 18 | Image source plane | infinity | — | — | — | — |

Note:
the reference wavelength is 555 nm

TABLE 6

| Surface | 2 | 3 | 7 9 15 | 8 | 16 |
|---|---|---|---|---|---|
| K: | −3.7944E−01 | 0.0000E+00 | 0.0000E+00 | | −4.6402E−01 |
| A4: | 1.0923E−06 | 0.0000E+00 | 0.0000E+00 | | −1.1662E−07 |
| A6: | 3.3035E−09 | 0.0000E+00 | 0.0000E+00 | | 4.7147E−10 |
| A8: | −8.5443E−12 | 0.0000E+00 | 0.0000E+00 | | −3.1806E−13 |
| A10: | −7.7605E−17 | 0.0000E+00 | 0.0000E+00 | | 1.1838E−16 |
| A12: | 2.2334E−17 | 0.0000E+00 | 0.0000E+00 | | 1.3173E−20 |
| A14: | −2.6383E−20 | 0.0000E+00 | 0.0000E+00 | | 6.6053E−23 |
| A16: | 9.3886E−24 | 0.0000E+00 | 0.0000E+00 | | −5.7370E−26 |
| A18: | 0.0000E+00 | 0.0000E+00 | 0.0000E+00 | | 0.0000E+00 |
| A20: | 0.0000E+00 | 0.0000E+00 | 0.0000E+00 | | 0.0000E+00 |

TABLE 7

| EFL_N(mm) | 33.09 | MS3_N(mm) | 15.58 |
|---|---|---|---|
| EFL_F(mm) | 35.54 | MS3_F(mm) | 9.07 |
| F_G1(mm) | 201.11 | MS2(mm) | 19.27 |
| F_G2(mm) | 308.60 | R1(mm) | 109.76 |
| T12_N(mm) | 3.69 | R2(mm) | infinity |
| T12_F(mm) | 10.20 | R3(mm) | −274.00 |
| FOV_N(degrees) | 110.1 | R4(mm) | −105.34 |
| FOV_F(degrees) | 93.8 | TL(mm) | 27.27 |
| GCT1(mm) | 8.00 | IMH(mm) | 26.94 |
| GCT2(mm) | 7.67 | — | — |

TABLE 8

| f_G2/f_G1 | 1.53 | R1/(EFL_N * EFL_F)[mm$^{-1}$] | 0.09 |
|---|---|---|---|
| EFL_N * TL/(EFL_F * IMH) | 0.94 | EFL_F/R1 | 0.32 |
| MS2/EFL_F | 0.54 | TL/EFL_N | 0.82 |
| (T12_F − T12_N)/EFL_N | 0.20 | GCT2/GCT1 | 0.96 |
| GCT1/(MS2) | 0.42 | R4/R3 | 0.38 |
| f_G2/(MS3_N * MS3_F)[mm$^{-1}$] | 2.18 | MS2/f_G2 | 0.06 |
| MS3_F/f_G1 | 0.05 | FOV_F/(T12_F * IMH) | 0.34 |
| MS3_N/GCT2 | 2.03 | — | — |

In the second embodiment, the equation of the aspheric surface profiles of the aforementioned lenses is the same as the equation of the aspheric surface profiles of the aforementioned lenses in the first embodiment. The values of the parameters in Table 7 can be calculated from Tables 5 and 6. The values of the conditions in Table 8 can be calculated from Table 7.

Third Embodiment

Figure 3A:
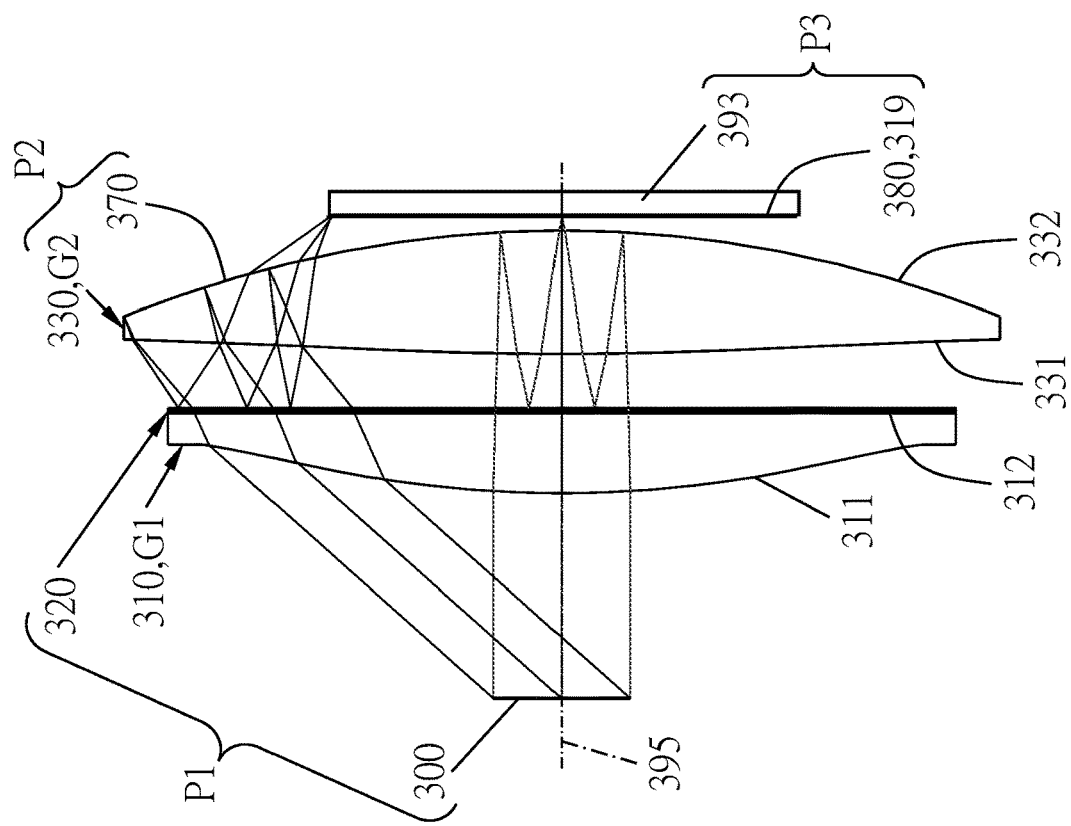
FIG. 3A shows an optical lens assembly focusing at a near point in accordance with a third embodiment of the present invention.
Figure 3B:
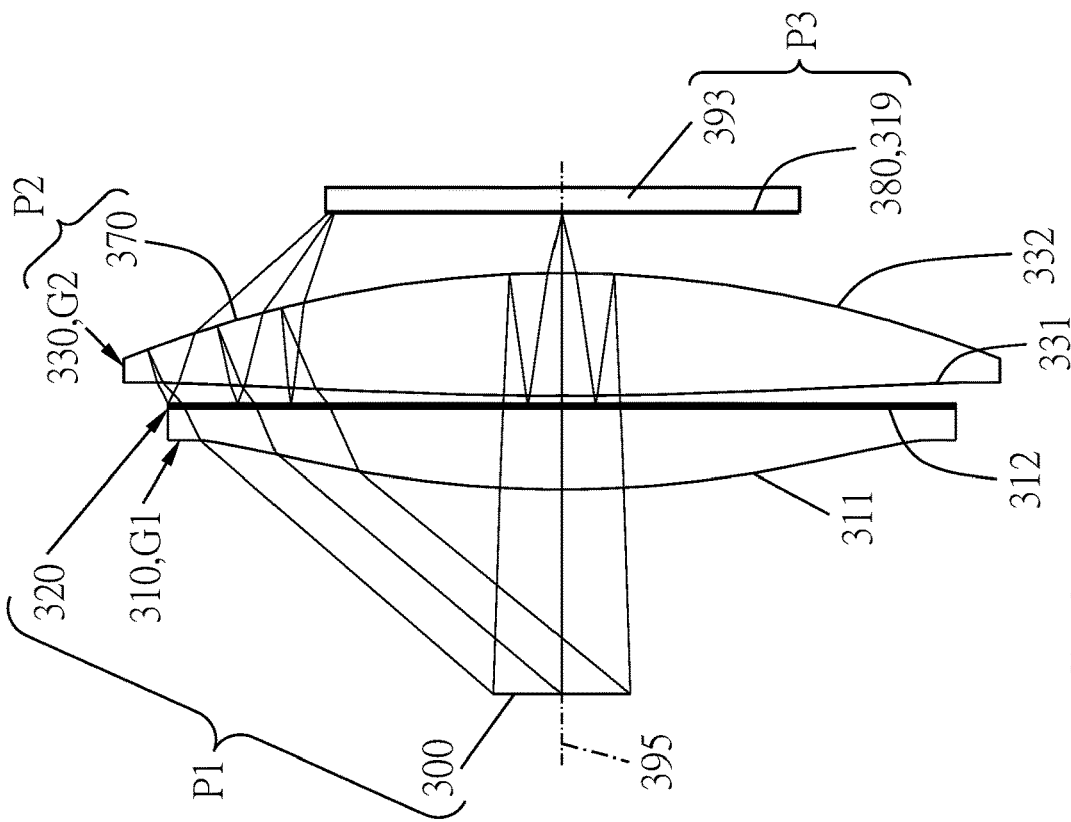
FIG. 3B shows the optical lens assembly focusing at a far point in accordance with the third embodiment of the present invention.

Referring to FIGS. 3A-3B, FIG. 3A shows an optical lens assembly focusing at a near point in accordance with a third embodiment of the present invention, and FIG. 3B shows the optical lens assembly focusing at a far point in accordance with the third embodiment of the present invention. The optical lens assembly includes, in order from a visual side to an image source side along an optical axis 395: a first group P1, a second group P2 and a third group P3. During focusing (or zooming) process, the second group P2 is movable relative to the first group P1 along the optical axis 395 between the first group P1 and the third group P3.

The first group P1 includes a stop 300, a first lens group G1 (that is, a first lens 310) and an optical element 320. The stop 300 may be at where the user's eyes view the virtual image. The first lens 310 is located between the stop 300 and the optical element 320. The second group P2 includes, in order from the visual side to the image source side: a second lens group G2 (that is, a second lens 330) with positive refractive power and a partial-reflective-partial-transmissive element 370. The third group P3 includes, in order from the visual side to the image source side: a second phase retarder 380 and an image source plane 391. The optical lens assembly has a total of two lenses with refractive power, but is not limited thereto. The optical lens assembly works in cooperation with an image source 393. The image source plane 391 can be located at the image source 393. The type of the image source 393 may be a liquid crystal display, an OLED display, or a LED display, but is not limited thereto.

The first lens 310 with positive refractive power includes a visual-side surface 311 and an image source-side surface 312, the visual-side surface 311 of the first lens 310 is convex in a paraxial region thereof, the image source-side surface 312 of the first lens 310 is flat in a paraxial region thereof, and the visual-side surface 311 of the first lens 310 is aspheric.

The optical element 320 includes, in order from the visual side to the image source side, an absorptive polarizer, a reflective polarizer and a first phase retarder. The configuration of the three elements may refer to that of the absorptive polarizer 121, the reflective polarizer 122 and the first phase retarder 123 of the first embodiment and will not be explained again.

The second lens 330 with positive refractive power includes a visual-side surface 331 and an image source-side surface 332, the visual-side surface 331 of the second lens 330 is convex in a paraxial region thereof, the image source-side surface 332 of the second lens 330 is convex in a paraxial region thereof, and the visual-side surface 331 and the image source-side surface 332 of the second lens 330 are aspheric.

The partial-reflective-partial-transmissive element 370 is disposed (for example, but not limited to, by coating) on the image source-side surface 332 of the second lens 330 and has an average light reflectance of at least 30%, preferably 50%, in the visible light range. The average light reflectance here is an average value of different reflectance of the partial-reflective-partial-transmissive element 370 for different wavelengths.

The second phase retarder 380 is disposed between the partial-reflective-partial-transmissive element 370 and the image source plane 391 and is closer to the image source plane 391. The second phase retarder 380 is, for example, but not limited to, a quarter-wave plate.

The detailed data of the third embodiment is shown in Tables 9-12.

TABLE 9

Embodiment 3
Far point: EFL_F = 18.04 mm, EPD (entrance pupil diameter) = 8.00 mm, FOV_F = 96.6 degrees
Near point: EFL_N = 16.71 mm, EPD (entrance pupil diameter) = 8.00 mm, FOV_N = 99.7 degrees

| Surface | | Curvature Radius | Thickness/gap | | Refractive Index (nd) | Abbe number (vd) | length Focal |
|---|---|---|---|---|---|---|---|
| 0 | | infinity | −10000.000 | (Far point) | — | — | — |
| | | | −125.000 | (Near point) | | | |
| 1 | Stop | infinity | 12.000 | | — | — | — |
| 2 | First lens | 64.126 | 4.998 | | 1.544 | 55.9 | 117.49 |
| 3 | Absorptive polarizer | infinity | 0.100 | | 1.533 | 56.0 | — |
| 4 | Reflective polarizer | infinity | 0.100 | | 1.533 | 56.0 | — |
| 5 | First phase retarder | infinity | 0.100 | | 1.533 | 56.0 | — |
| 6 | | infinity | 2.859 | (Far point) | — | — | — |
| | | | 0.150 | (Near point) | | | |
| 7 | Second lens | 229.560 | 7.211 | | 1.544 | 55.9 | — |
| 8 | Partial-reflective-partial-transmissive element | −65.901 | −7.211 | | mirror | | — |
| 9 | | 229.560 | −2.859 | (Far point) | — | — | — |
| | | | −0.150 | (Near point) | | | |
| 10 | First phase retarder | infinity | −0.100 | | 1.533 | 56.0 | — |
| 11 | Reflective polarizer | infinity | −0.100 | | 1.533 | 56.0 | — |
| 12 | | infinity | 0.100 | | mirror | | — |
| 13 | First phase retarder | infinity | 0.100 | | 1.533 | 56.0 | — |
| 14 | | infinity | 2.859 | (Far point) | — | — | — |
| | | | 0.150 | (Near point) | | | |
| 15 | Second lens | 229.560 | 7.211 | | 1.544 | 55.9 | 94.63 |
| 16 | | −65.901 | 0.690 | (Far point) | — | — | — |
| | | | 3.399 | (Near point) | | | |
| 17 | Second phase retarder | infinity | 0.100 | | 1.533 | 56.0 | — |
| 18 | Image source plane | infinity | — | | — | — | — |

Note:
the reference wavelength is 555 nm

TABLE 10

| Surface | 2 | 3 | 7 | 9 | 15 | 8 | 16 |
|---|---|---|---|---|---|---|---|
| K: | 5.0575E+00 | 0.0000E+00 | 0.0000E+00 | | | 2.6852E+00 | |
| A4: | −9.1408E−06 | 0.0000E+00 | 3.9725E−07 | | | 1.2669E−06 | |
| A6 | 4.5323E−08 | 0.0000E+00 | −6.3122E−09 | | | 2.3658E−09 | |
| A8: | −1.3818E−10 | 0.0000E+00 | 8.2972E−13 | | | −2.7864E−12 | |
| A10: | −2.3710E−13 | 0.0000E+00 | 8.9865E−15 | | | −1.5197E−16 | |
| A12: | 2.1300E−15 | 0.0000E+00 | 1.0857E−17 | | | 3.4968E−18 | |
| A14: | −4.5001E−18 | 0.0000E+00 | −2.0725E−20 | | | 5.0938E−21 | |
| A16: | 3.1581E−21 | 0.0000E+00 | 0.0000E+00 | | | −8.1518E−24 | |
| A18: | 0.0000E+00 | 0.0000E+00 | 0.0000E+00 | | | 0.0000E+00 | |
| A20: | 0.0000E+00 | 0.0000E+00 | 0.0000E+00 | | | 0.0000E+00 | |

TABLE 11

| EFL_N(mm) | 16.71 | MS3_N(mm) | 10.71 |
|---|---|---|---|
| EFL_F(mm) | 18.04 | MS3_F(mm) | 8.00 |
| F_G1(mm) | 117.49 | MS2(mm) | 11.16 |
| F_G2(mm) | 94.63 | R1(mm) | 64.13 |
| T12_N(mm) | 0.45 | R2(mm) | infinity |
| T12_F(mm) | 3.16 | R3(mm) | 229.56 |
| FOV_N(degrees) | 99.7 | R4(mm) | −65.90 |

TABLE 11-continued

| FOV_F(degrees) | 96.6 | TL(mm) | 16.16 |
|---|---|---|---|
| GCT1(mm) | 5.00 | IMH(mm) | 13.47 |
| GCT2(mm) | 7.21 | — | — |

TABLE 12

| f_G2/f_G1 | 0.81 | R1/(EFL_N * EFL_F)[mm$^{-1}$] | 0.21 |
|---|---|---|---|
| EFL_N * TL/(EFL_F * IMH) | 1.11 | EFL_F/R1 | 0.28 |
| MS2/EFL_F | 0.62 | TL/EFL_N | 0.97 |
| (T12_F − T12_N)/EFL_N | 0.16 | GCT2/GCT1 | 1.44 |
| GCT1/(MS2) | 0.45 | R4/R3 | −0.29 |
| f_G2/(MS3_N * MS3_F)[mm$^{-1}$] | 1.10 | MS2/f_G2 | 0.12 |
| MS3_F/f_G1 | 0.07 | FOV_F/(T12_F * IMH) | 2.27 |
| MS3_N/GCT2 | 1.49 | — | — |

In the third embodiment, the equation of the aspheric surface profiles of the aforementioned lenses is the same as the equation of the aspheric surface profiles of the aforementioned lenses in the first embodiment. The values of the parameters in Table 11 can be calculated from Tables 9 and 10. The values of the conditions in Table 12 can be calculated from Table 11.

Fourth Embodiment

Figure 4A:
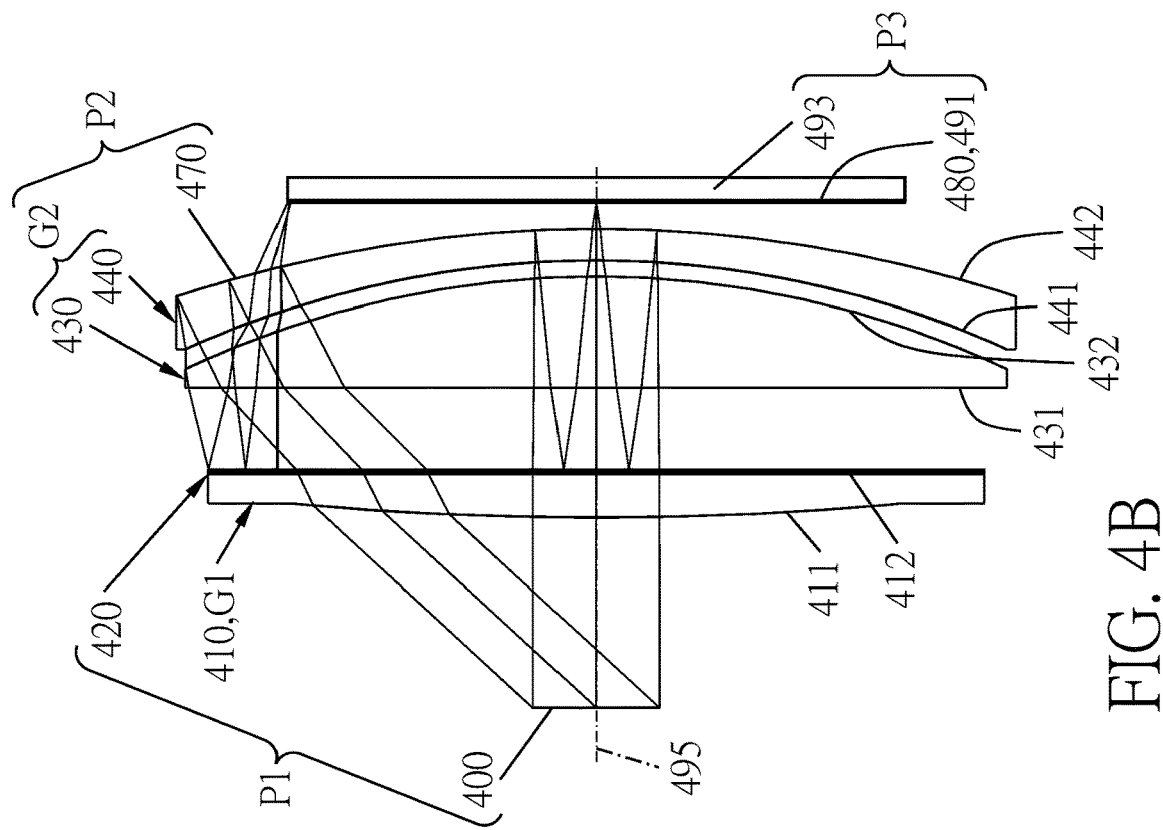
FIG. 4A shows an optical lens assembly focusing at a near point in accordance with a fourth embodiment of the present invention.
Figure 4B:
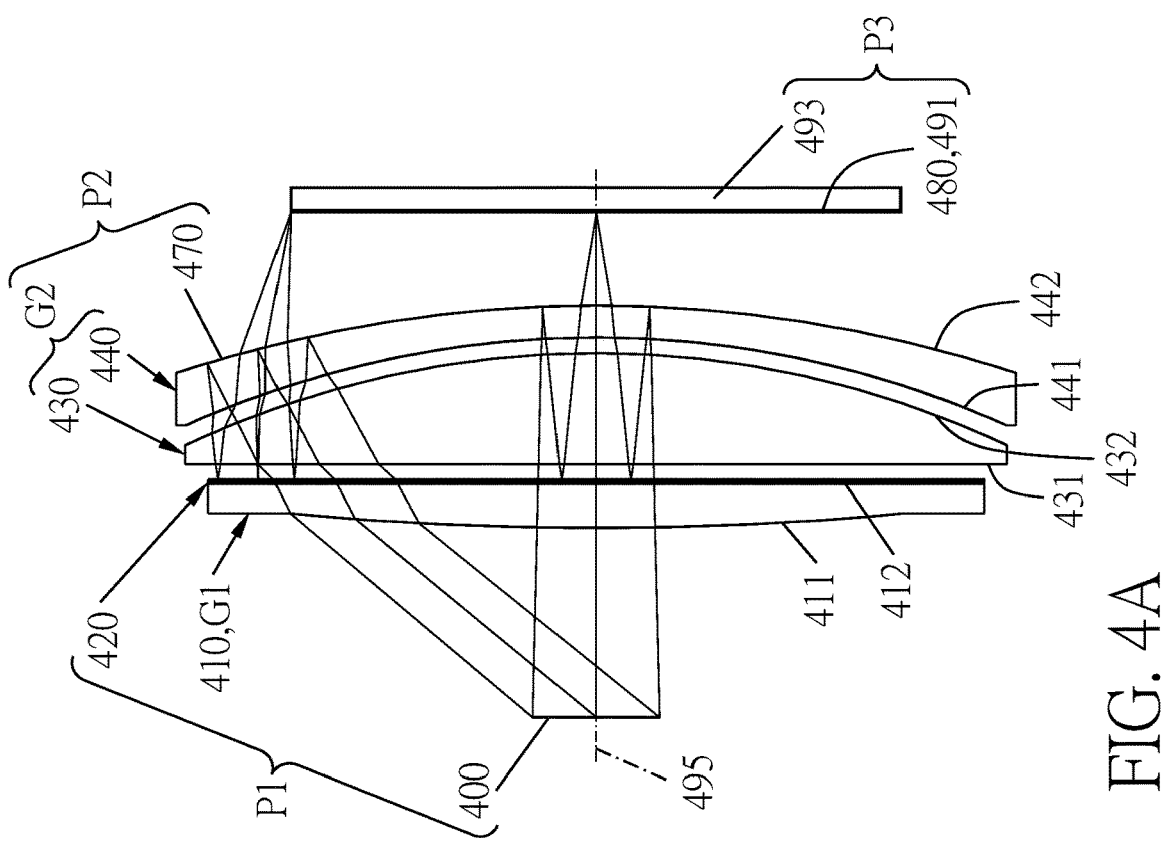
FIG. 4B shows the optical lens assembly focusing at a far point in accordance with the fourth embodiment of the present invention.

Referring to FIGS. 4A-4B, FIG. 4A shows an optical lens assembly focusing at a near point in accordance with a fourth embodiment of the present invention, FIG. 4B shows the optical lens assembly focusing at a far point in accordance with the fourth embodiment of the present invention. The optical lens assembly includes, in order from a visual side to an image source side along an optical axis 495: a first group P1, a second group P2 and a third group P3. During focusing (or zooming) process, the second group P2 is movable relative to the first group P1 along the optical axis 495 between the first group P1 and the third group P3.

The first group P1 includes a stop 400, a first lens group G1 (that is, a first lens 410) and an optical element 420. The stop 400 may be at where the user's eyes view the virtual image. The first lens 410 is located between the stop 400 and the optical element 420. The second group P2 includes, in order from the visual side to the image source side: a second lens group G2 with positive refractive power and a partial-reflective-partial-transmissive element 470. The second lens group G2 includes, in order from the visual side to the image source side: a second lens 430 and a third lens 440. The third group P3 includes, in order from the visual side to the image source side: a second phase retarder 480 and an image source plane 491. The optical lens assembly has a total of three lenses with refractive power, but is not limited thereto. The optical lens assembly works in cooperation with an image source 493. The image source plane 491 can be located at the image source 493. The type of the image source 493 may be a liquid crystal display, an OLED display, or a LED display, but is not limited thereto.

The first lens 410 with positive refractive power includes a visual-side surface 411 and an image source-side surface 412, the visual-side surface 411 of the first lens 410 is convex in a paraxial region thereof, the image source-side surface 412 of the first lens 410 is flat in a paraxial region thereof, and the visual-side surface 411 of the first lens 410 is aspheric.

The optical element 420 includes, in order from the visual side to the image source side, an absorptive polarizer, a reflective polarizer and a first phase retarder. The configuration of the three elements may refer to that of the absorptive polarizer 121, the reflective polarizer 122 and the first phase retarder 123 of the first embodiment and will not be explained again.

The second lens 430 with positive refractive power includes a visual-side surface 431 and an image source-side surface 432, the visual-side surface 431 of the second lens 430 is flat in a paraxial region thereof, the image source-side surface 432 of the second lens 430 is convex in a paraxial region thereof, and the image source-side surface 432 of the second lens 430 is aspheric.

The third lens 440 with negative refractive power includes a visual-side surface 441 and an image source-side surface 442, the visual-side surface 441 of the third lens 440 is concave in a paraxial region thereof, the image source-side surface 442 of the third lens 440 is convex in a paraxial region thereof, the visual-side surface 441 of the third lens 440 is spherical, and the image source-side surface 442 of the third lens 440 is aspheric.

The partial-reflective-partial-transmissive element 470 is disposed (for example, but not limited to, by coating) on the image source-side surface 442 of the third lens 440 and has an average light reflectance of at least 30%, preferably 50%, in the visible light range. The average light reflectance here is an average value of different reflectance of the partial-reflective-partial-transmissive element 470 for different wavelengths.

The second phase retarder 480 is disposed between the partial-reflective-partial-transmissive element 470 and the image source plane 491 and is closer to the image source plane 491. The second phase retarder 480 is, for example, but not limited to, a quarter-wave plate.

The detailed data of the fourth embodiment is shown in Tables 13-16.

TABLE 13

Embodiment 4
Far point: EFL_F = 26.04 mm, EPD (entrance pupil diameter) = 8.00 mm, FOV_F = 94.8 degrees
Near point: EFL_N = 24.50 mm, EPD (entrance pupil diameter) = 8.00 mm, FOV_N = 100.9 degrees

| Surface | | Curvature Radius | Thickness/gap | | Refractive Index (nd) | Abbe number (vd) | Focal length |
|---|---|---|---|---|---|---|---|
| 0 | | infinity | −10000.000 | (Far point) | — | — | — |
| | | | −125.000 | (Near point) | | | |
| 1 | Stop | infinity | 12.000 | | — | — | — |
| 2 | First lens | 245.235 | 3.020 | | 1.544 | 55.9 | 449.08 |
| 3 | Absorptive polarizer | infinity | 0.100 | | 1.533 | 56.0 | — |
| 4 | Reflective polarizer | infinity | 0.100 | | 1.533 | 56.0 | — |
| 5 | First phase retarder | infinity | 0.100 | | 1.533 | 56.0 | — |
| 6 | | infinity | 4.859 | (Far point) | — | — | — |
| | | | 0.657 | (Near point) | | | |
| 7 | Second lens | infinity | 7.000 | | 1.544 | 55.9 | 110.78 |
| 8 | | −60.492 | 1.004 | | — | — | — |
| 9 | Third lens | −62.914 | 2.010 | | 1.661 | 20.4 | −402.91 |
| 10 | Partial-reflective-partial-transmissive element | −83.164 | −2.010 | | mirror | | — |
| 11 | | −62.914 | −1.004 | | — | — | — |
| 12 | Second lens | −60.492 | −7.000 | | — | — | — |

TABLE 13-continued

Embodiment 4
Far point: EFL_F = 26.04 mm, EPD (entrance pupil diameter) = 8.00 mm, FOV_F = 94.8 degrees
Near point: EFL_N = 24.50 mm, EPD (entrance pupil diameter) = 8.00 mm, FOV_N = 100.9 degrees

| Surface | | Curvature Radius | Thickness/gap | | Refractive Index (nd) | Abbe number (vd) | Focal length |
|---|---|---|---|---|---|---|---|
| 13 | | infinity | −4.859<br>−0.657 | (Far point)<br>(Near point) | — | — | — |
| 14 | First phase retarder | infinity | −0.100 | | — | — | — |
| 15 | Reflective polarizer | infinity | −0.100 | | — | — | — |
| 16 | | infinity | 0.100 | | mirror | | |
| 17 | First phase retarder | infinity | 0.100 | | — | — | — |
| 18 | | infinity | 4.859<br>0.657 | (Far point)<br>(Near point) | — | — | — |
| 19 | Second lens | infinity | 7.000 | | 1.544 | 55.9 | 110.78 |
| 20 | | −60.492 | 1.004 | | — | — | — |
| 21 | Third lens | −62.914 | 2.010 | | 1.533 | 56.0 | −402.91 |
| 22 | | −83.164 | 1.569<br>5.771 | (Far point)<br>(Near point) | — | — | — |
| 23 | Second phase retarder | infinity | 0.100 | | 1.533 | 56.0 | — |
| 24 | Image source plane | infinity | — | | — | — | — |

Note:
the reference wavelength is 555 nm

TABLE 14

| Surface | 2 | 3 | 7 | 13 | 19 |
|---|---|---|---|---|---|
| K: | 0.0000E+00 | 0.0000E+00 | | 0.0000E+00 | |
| A4: | 1.1230E−06 | 0.0000E+00 | | 0.0000E+00 | |
| A6: | −5.7852E−10 | 0.0000E+00 | | 0.0000E+00 | |
| A8: | 3.3701E−12 | 0.0000E+00 | | 0.0000E+00 | |
| A10: | −5.5589E−15 | 0.0000E+00 | | 0.0000E+00 | |
| A12: | −4.0184E−17 | 0.0000E+00 | | 0.0000E+00 | |
| A14: | 3.6902E−20 | 0.0000E+00 | | 0.0000E+00 | |
| A16: | 9.3833E−23 | 0.0000E+00 | | 0.0000E+00 | |
| A18: | 0.0000E+00 | 0.0000E+00 | | 0.0000E+00 | |
| A20: | 0.0000E+00 | 0.0000E+00 | | 0.0000E+00 | |

| Surface | 8 | 12 | 20 | 9 | 11 | 21 | 10 | 22 |
|---|---|---|---|---|---|---|---|---|
| K: | 3.1396E−02 | | 0.0000E+00 | | | | | −5.5129E−01 |
| A4: | −2.2945E−08 | | 0.0000E+00 | | | | | −2.1583E−07 |
| A6: | −7.7592E−12 | | 0.0000E+00 | | | | | 3.7854E−10 |
| A8: | −7.8501E−15 | | 0.0000E+00 | | | | | −2.3653E−13 |
| A10: | −1.1527E−18 | | 0.0000E+00 | | | | | 3.2643E−16 |
| A12: | 3.9760E−20 | | 0.0000E+00 | | | | | −4.6249E−20 |
| A14: | 1.5060E−22 | | 0.0000E+00 | | | | | −9.4160E−22 |
| A16: | 4.0196E−25 | | 0.0000E+00 | | | | | 9.5829E−25 |
| A18: | 0.0000E+00 | | 0.0000E+00 | | | | | 0.0000E+00 |
| A20: | 0.0000E+00 | | 0.0000E+00 | | | | | 0.0000E+00 |

TABLE 15

| EFL_N(mm) | 24.50 | MS3_N(mm) | 15.88 |
|---|---|---|---|
| EFL_F(mm) | 26.04 | MS3_F(mm) | 11.68 |
| F_G1(mm) | 449.08 | MS2(mm) | 16.84 |
| F_G2(mm) | 154.31 | R1(mm) | 245.24 |
| T12_N(mm) | 0.96 | R2(mm) | infinity |
| T12_F(mm) | 5.16 | R3(mm) | infinity |
| FOV_N(degrees) | 100.9 | R4(mm) | −83.16 |
| FOV_F(degrees) | 94.8 | TL(mm) | 19.86 |
| GCT1(mm) | 3.02 | IMH(mm) | 19.25 |
| GCT2(mm) | 10.01 | — | — |

TABLE 16

| f_G2/f_G1 | 0.34 | R1/(EFL_N * EFL_F)[mm$^{-1}$] | 0.38 |
|---|---|---|---|
| EFL_N * TL/(EFL_F * IMH) | 0.97 | EFL_F/R1 | 0.11 |
| MS2/EFL_F | 0.65 | TL/EFL_N | 0.81 |
| (T12_F − T12_N)/EFL_N | 0.17 | GCT2/GCT1 | 3.32 |
| GCT1/(MS2) | 0.18 | R4/R3 | 0 |
| f_G2/(MS3_N * MS3_F)[mm$^{-1}$] | 0.83 | MS2/f_G2 | 0.11 |
| MS3_F/f_G1 | 0.03 | FOV_F/(T12_F * IMH) | 0.95 |
| MS3_N/GCT2 | 1.59 | — | — |

In the fourth embodiment, the equation of the aspheric surface profiles of the aforementioned lenses is the same as the equation of the aspheric surface profiles of the aforementioned lenses in the first embodiment. The values of the parameters in Table 15 can be calculated from Tables 13 and 14. The values of the conditions in Table 16 can be calculated from Table 15. In Table 13, the definitions of the surfaces 0 to 7 are the same as those of the surfaces 0 to 7 of Table 2 of the first embodiment; the surfaces 8 and 20 represent a gap between the second lens 430 and the third lens 440 along the optical axis 495; the surfaces 9 and 21 represent the thickness of the third lens 440 along the optical axis 495; the surface 10 represents the thickness of the partial-reflective-partial-transmissive element 470 along the optical axis 495; the surface 11 represents a gap between the partial-reflective-partial-transmissive element 470 and the second lens 430 along the optical axis 495; the surfaces 12 and 19 represent the thickness of the second lens 430 along the optical axis 495; the surfaces 13 and 18 represent a gap between the second lens 430 and the first phase retarder along the optical axis 495; the surfaces 14 and 17 represent the thickness of the first phase retarder along the optical axis 495; the surfaces 15 and 16 represent the thickness of the reflective polarizer along the optical axis 495; the surface 22 represents a gap between the third lens 440 and the second phase retarder 480 along the optical axis 495; the surfaces 23 represents the thickness of the second phase retarder 480 along the optical axis 495. The values of the parameters having a negative sign in the table represent light reflective transmission.

Fifth Embodiment

Figure 5A:
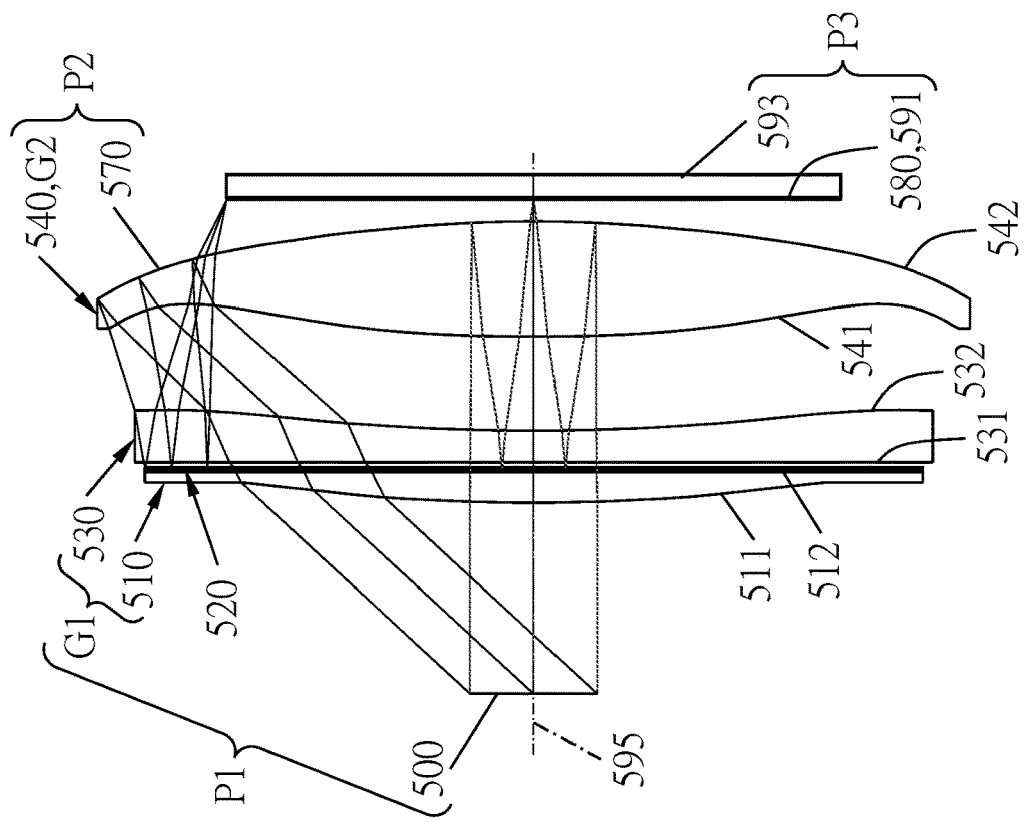
FIG. 5A shows an optical lens assembly focusing at a near point in accordance with a fifth embodiment of the present invention.
Figure 5B:
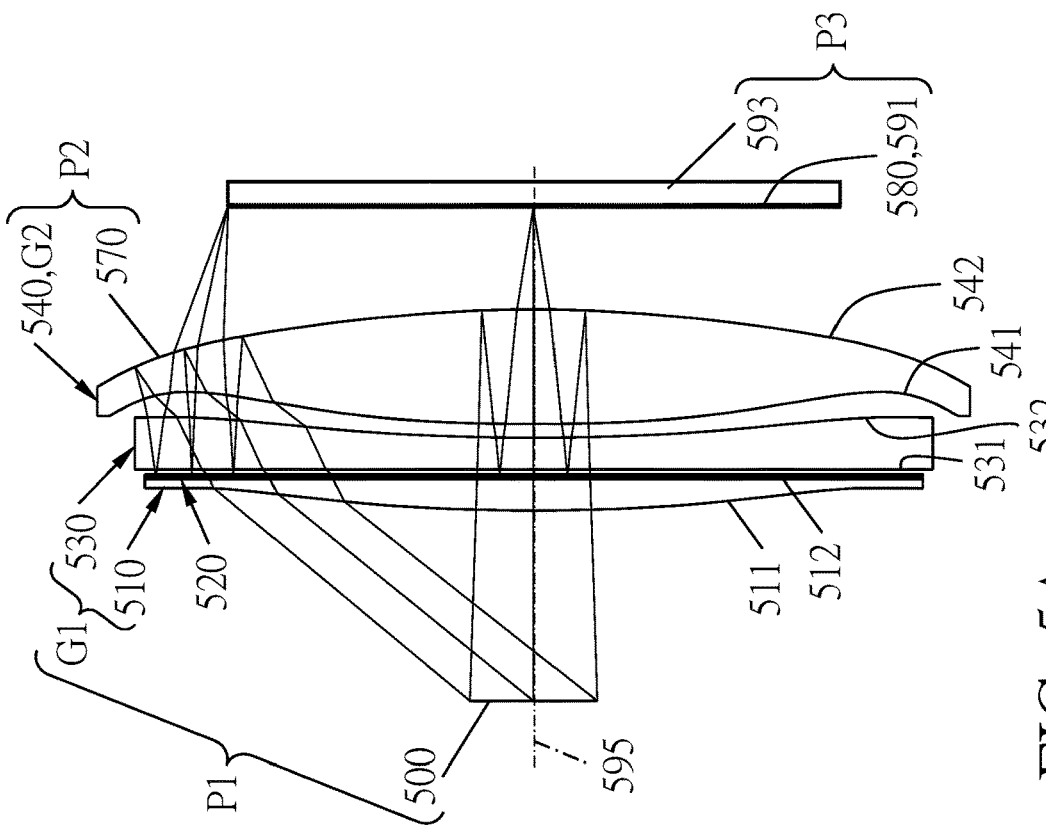
FIG. 5B shows the optical lens assembly focusing at a far point in accordance with the fifth embodiment of the present invention.

Referring to FIGS. 5A-5B, FIG. 5A shows an optical lens assembly focusing at a near point in accordance with a fifth embodiment of the present invention, and FIG. 5B shows the optical lens assembly focusing at a far point in accordance with the fifth embodiment of the present invention. The optical lens assembly includes, in order from a visual side to an image source side along an optical axis 595: a first group P1, a second group P2 and a third group P3. During focusing (or zooming) process, the second group P2 is movable relative to the first group P1 along the optical axis 595 between the first group P1 and the third group P3.

The first group P1 includes a stop 500, a first lens group G1 and an optical element 520. The stop 500 may be at where the user's eyes view the virtual image. The first lens group G1 includes, in order from the visual side to the image source side: a first lens 510 and a second lens 530. The first lens 510 is located between the stop 500 and an optical element 520. The optical element 520 is located between the first lens 510 and the second lens 530. The second group P2 includes, in order from the visual side to the image source side: a second lens group G2 (that is, a third lens 540) with positive refractive power and a partial-reflective-partial-transmissive element 570. The third group P3 includes, in order from the visual side to the image source side: a second phase retarder 580 and an image source plane 591. The optical lens assembly has a total of three lenses with refractive power, but is not limited thereto. The optical lens assembly works in cooperation with an image source 593. The image source plane 591 can be located at the image source 593. The type of the image source 593 may be a liquid crystal display, an OLED display, or a LED display, but is not limited thereto.

The first lens 510 with positive refractive power includes a visual-side surface 511 and an image source-side surface 512, the visual-side surface 511 of the first lens 510 is convex in a paraxial region thereof, the image source-side surface 512 of the first lens 510 is flat in a paraxial region thereof, and the visual-side surface 511 of the first lens 510 is aspheric.

The optical element 520 includes, in order from the visual side to the image source side, an absorptive polarizer, a reflective polarizer and a first phase retarder. The configuration of the three elements may refer to that of the absorptive polarizer 121, the reflective polarizer 122 and the first phase retarder 123 of the first embodiment and will not be explained again.

The second lens 530 with negative refractive power includes a visual-side surface 531 and an image source-side surface 532, the visual-side surface 531 of the second lens 530 is flat in a paraxial region thereof, the image source-side surface 532 of the second lens 530 is concave in a paraxial region thereof, and the image source-side surface 532 of the second lens 530 is aspheric.

The third lens 540 with positive refractive power includes a visual-side surface 541 and an image source-side surface 542, the visual-side surface 541 of the third lens 540 is convex in a paraxial region thereof, the image source-side surface 542 of the third lens 540 is convex in a paraxial region thereof, and the visual-side surface 541 and the image source-side surface 542 of the third lens 540 are aspheric.

The partial-reflective-partial-transmissive element 570 is disposed (for example, but not limited to, by coating) on the image source-side surface 542 of the third lens 540 and has an average light reflectance of at least 30%, preferably 50%, in the visible light range. The average light reflectance here is an average value of different reflectance of the partial-reflective-partial-transmissive element 570 for different wavelengths.

The second phase retarder 580 is disposed between the partial-reflective-partial-transmissive element 570 and the image source plane 591 and is closer to the image source plane 591. The second phase retarder 580 is, for example, but not limited to, a quarter-wave plate.

The detailed data of the fifth embodiment is shown in Tables 17-20.

TABLE 17

Embodiment 5
Far point: EFL_F = 27.04 mm, EPD (entrance pupil diameter) = 8.00 mm, FOV_F = 94.7 degrees
Near point: EFL_F = 25.83 mm, EPD (entrance pupil diameter) = 8.00 mm, FOV_N = 101.9 degrees

| Surface | | Curvature Radius | Thickness/gap | | Refractive Index (nd) | Abbe number (vd) | Focal length |
|---|---|---|---|---|---|---|---|
| 0 | | infinity | −10000.000 | (Far point) | — | — | — |
|   | |          | −125.000   | (Near point) |   |   |   |
| 1 | Stop | infinity | 12.000 | | — | — | — |
| 2 | First lens | 122.326 | 2.261 | | 1.544 | 55.9 | 224.13 |
| 3 | Absorptive polarizer | infinity | 0.100 | | 1.533 | 56.0 | — |
| 4 | Reflective polarizer | infinity | 0.100 | | 1.533 | 56.0 | — |
| 5 | First phase retarder | infinity | 0.100 | | 1.533 | 56.0 | — |
| 6 | Second lens | infinity | 2.000 | | 1.661 | 20.4 | −230.04 |
| 7 | | 153.395 | 5.935 | (Far point) | — | — | — |
|   | |         | 0.871 | (Near point) |   |   |   |
| 8 | Third lens | 238.836 | 7.217 | | 1.544 | 55.9 | 114.00 |
| 9 | Partial-reflective-partial-transmissive element | −83.239 | −7.217 | | mirror | | — |

TABLE 17-continued

Embodiment 5
Far point: EFL_F = 27.04 mm, EPD (entrance pupil diameter) = 8.00 mm, FOV_F = 94.7 degrees
Near point: EFL_F = 25.83 mm, EPD (entrance pupil diameter) = 8.00 mm, FOV_N = 101.9 degrees

| Surface | | Curvature Radius | Thickness/gap | | Refractive Index (nd) | Abbe number (vd) | Focal length |
|---|---|---|---|---|---|---|---|
| 10 | | 238.836 | −5.935 | (Far point) | — | — | — |
| | | | −0.871 | (Near point) | | | |
| 11 | Second lens | 153.395 | −2.000 | | — | — | — |
| 12 | First phase retarder | infinity | −0.100 | | 1.533 | 56.0 | — |
| 13 | Reflective polarizer | infinity | −0.100 | | 1.533 | 56.0 | — |
| 14 | | infinity | 0.100 | | mirror | — | — |
| 15 | First phase retarder | infinity | 0.100 | | — | — | — |
| 16 | Second lens | infinity | 2.000 | | 1.661 | 20.4 | −230.04 |
| 17 | | 153.395 | 5.935 | (Far point) | — | — | — |
| | | | 0.871 | (Near point) | | | |
| 18 | Third lens | 238.836 | 7.217 | | 1.544 | 55.9 | 114.00 |
| 19 | | −83.239 | 1.390 | (Far point) | — | — | — |
| | | | 6.454 | (Near point) | | | |
| 20 | Second phase retarder | infinity | 0.100 | | 1.533 | 56.0 | — |
| 21 | Image source plane | infinity | — | | — | — | — |

Note:
the reference wavelength is 555 nm

TABLE 18

| Surface | 2 | 3 | 6 | 12 | 16 |
|---|---|---|---|---|---|
| K: | −1.0903E+01 | 0.0000E+00 | | 0.0000E+00 | |
| A4: | −7.1807E−06 | 0.0000E+00 | | 0.0000E+00 | |
| A6: | 1.2811E−07 | 0.0000E+00 | | 0.0000E+00 | |
| A8: | −7.7555E−10 | 0.0000E+00 | | 0.0000E+00 | |
| A10: | 2.2343E−12 | 0.0000E+00 | | 0.0000E+00 | |
| A12: | −3.1320E−15 | 0.0000E+00 | | 0.0000E+00 | |
| A14: | 1.2458E−18 | 0.0000E+00 | | 0.0000E+00 | |
| A16: | 8.8668E−22 | 0.0000E+00 | | 0.0000E+00 | |
| A18: | 0.0000E+00 | 0.0000E+00 | | 0.0000E+00 | |
| A20: | 0.0000E+00 | 0.0000E+00 | | 0.0000E+00 | |

| Surface | 7 | 11 | 17 | 8 | 10 | 18 | 9 | 19 |
|---|---|---|---|---|---|---|---|---|
| K: | −8.2330E+00 | | | 5.3782E+01 | | | −7.3329E−01 | |
| A4: | 1.6938E−06 | | | 3.8261E−05 | | | 8.9536E−06 | |
| A6: | −4.2538E−09 | | | −2.3223E−07 | | | −3.9345E−08 | |
| A8: | 3.5756E−12 | | | 8.5235E−10 | | | 1.0529E−10 | |
| A10: | −1.3779E−14 | | | −1.9754E−12 | | | −1.5297E−13 | |
| A12: | −7.1277E−18 | | | 2.7291E−15 | | | 8.8430E−17 | |
| A14: | 2.8191E−21 | | | −2.1679E−18 | | | −1.4002E−20 | |
| A16: | 3.3863E−23 | | | 7.7177E−22 | | | 3.8020E−24 | |
| A18: | 0.0000E+00 | | | 0.0000E+00 | | | 0.0000E+00 | |
| A20: | 0.0000E+00 | | | 0.0000E+00 | | | 0.0000E+00 | |

TABLE 19

| EFL_N(mm) | 25.83 | MS3_N(mm) | 13.67 |
|---|---|---|---|
| EFL_F(mm) | 27.04 | MS3_F(mm) | 8.61 |
| F_G1(mm) | 5815.29 | MS2(mm) | 14.54 |
| F_G2(mm) | 114.00 | R1(mm) | 122.33 |
| T12_N(mm) | 0.87 | R2(mm) | 153.39 |
| T12_F(mm) | 5.94 | R3(mm) | 238.84 |
| FOV_N(degrees) | 101.9 | R4(mm) | −83.24 |
| FOV_F(degrees) | 94.7 | TL(mm) | 19.10 |
| GCT1(mm) | 4.56 | IMH(mm) | 19.25 |
| GCT2(mm) | 7.22 | — | — |

TABLE 20

| f_G2/f_G1 | 0.02 | R1/(EFL_N * EFL_F)[mm$^{-1}$] | 0.18 |
|---|---|---|---|
| EFL_N * TL/(EFL_F * IMH) | 0.95 | EFL_F/R1 | 0.22 |
| MS2/EFL_F | 0.54 | TL/EFL_N | 0.74 |
| (T12_F − T12_N)/EFL_N | 0.20 | GCT2/GCT1 | 1.58 |
| GCT1/(MS2) | 0.31 | R4/R3 | −0.35 |
| f_G2/(MS3_N * MS3_F)[mm$^{-1}$] | 0.97 | MS2/f_G2 | 0.13 |
| MS3_F/f_G1 | 0.001 | FOV_F/(T12_F * IMH) | 0.83 |
| MS3_N/GCT2 | 1.89 | — | — |

In the fifth embodiment, the equation of the aspheric surface profiles of the aforementioned lenses is the same as the equation of the aspheric surface profiles of the aforementioned lenses in the first embodiment. The values of the parameters in Table 19 can be calculated from Tables 17 and 18. The values of the conditions in Table 20 can be calculated from Table 19. In Table 17, the definitions of the surfaces 0 to 5 are the same as those of the surfaces 0 to 5 of the first embodiment; the surfaces 6, 11 and 16 represent the thickness of the second lens 530 along the optical axis 595; the surfaces 7 and 17 represent a gap between the second lens 530 and the third lens 540 along the optical axis 595; the surfaces 8 and 18 represent the thickness of the third lens 540 along the optical axis 595; the surfaces 9 and 20 represent the thicknesses of the partial-reflective-partial-transmissive element 570 and the second phase retarder 580 along the optical axis 595; the surface 10 represents a gap between the partial-reflective-partial-transmissive element 570 and the second lens 530 along the optical axis 595; the surfaces 12 and 15 represent the thickness of the first phase retarder along the optical axis 595; the surfaces 13 and 14 represent the thickness of the reflective polarizer along the optical axis 595; the surface 19 represents a gap between the third lens 540 and the second phase retarder 580 along the optical axis 595. The values of the parameters having a negative sign in the table represent light reflective transmission.

Sixth Embodiment

Figure 6A:
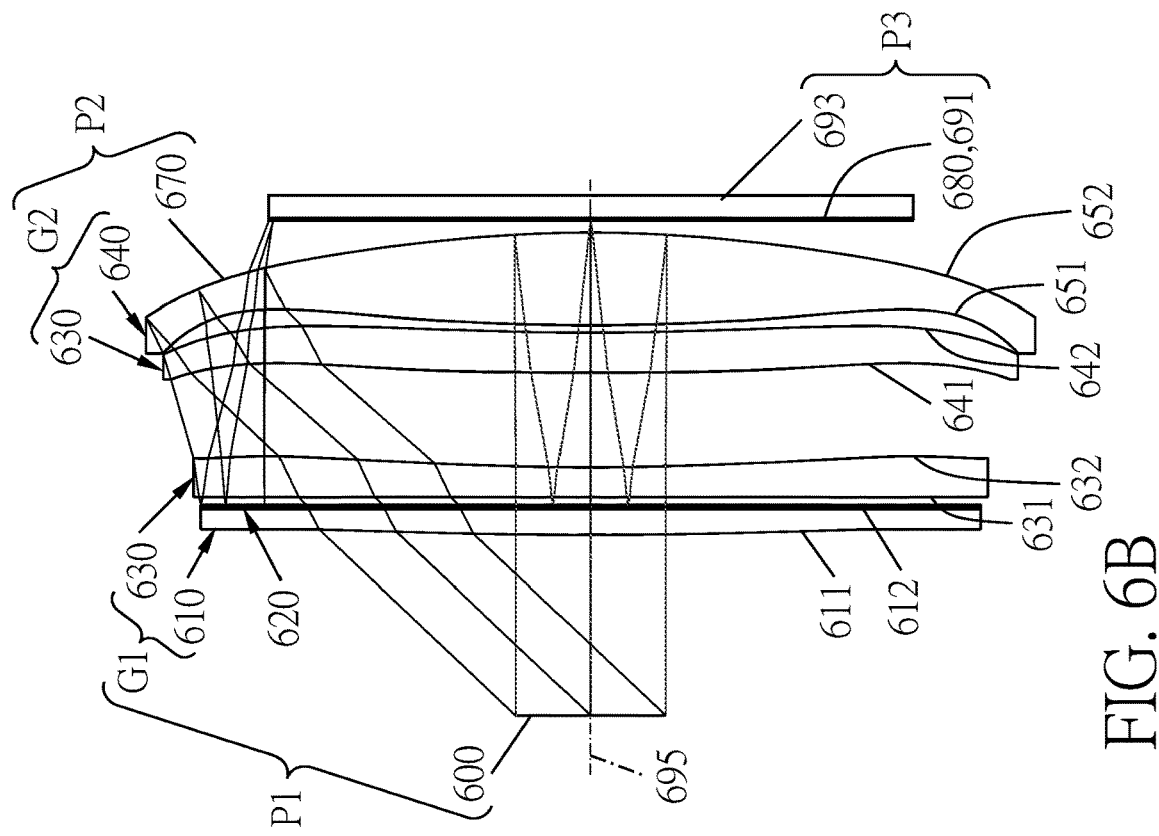
FIG. 6A shows an optical lens assembly focusing at a near point in accordance with a sixth embodiment of the present invention.
Figure 6B:
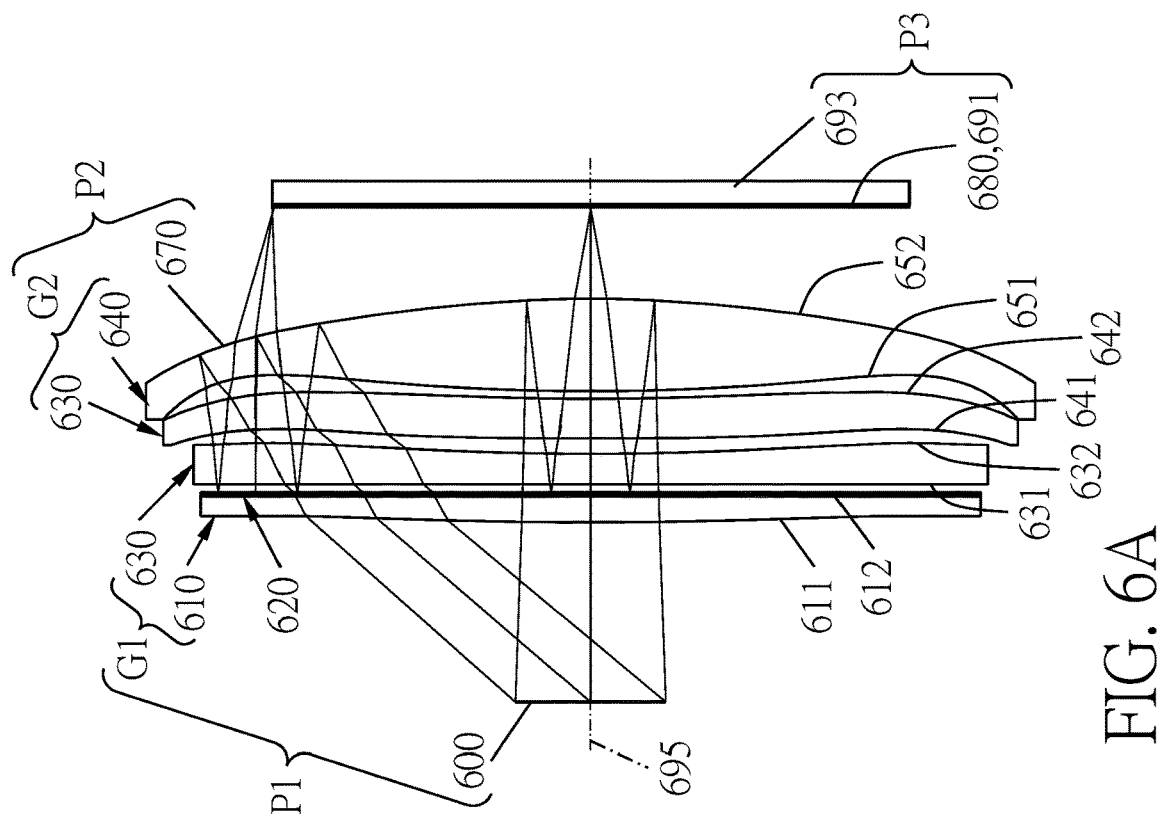
FIG. 6B shows the optical lens assembly focusing at a far point in accordance with the sixth embodiment of the present invention.

Referring to FIGS. 6A-6B, FIG. 6A shows an optical lens assembly focusing at a near point in accordance with a sixth embodiment of the present invention, and FIG. 6B shows the optical lens assembly focusing at a far point in accordance with the sixth embodiment of the present invention. The optical lens assembly includes, in order from a visual side to an image source side along an optical axis 695: a first group P1, a second group P2 and a third group P3. During focusing (or zooming) process, the second group P2 is movable relative to the first group P1 along the optical axis 695 between the first group P1 and the third group P3.

The first group P1 includes a stop 600, a first lens group G1 and an optical element 620. The stop 600 may be at where the user's eyes view the virtual image. The first lens group G1 includes, in order from the visual side to the image source side: a first lens 610 and a second lens 630. The first lens 610 is located between the stop 600 and an optical element 620. The optical element 620 is located between the first lens 610 and the second lens 630. The second group P2 includes, in order from the visual side to the image source side: a second lens group G2 with positive refractive power and a partial-reflective-partial-transmissive element 670. The second lens group G2 includes, in order from the visual side to the image source side: a third lens 640 and a fourth lens 650. The third group P3 includes, in order from the visual side to the image source side: a second phase retarder 680 and an image source plane 691. The optical lens assembly has a total of four lenses with refractive power, but is not limited thereto. The optical lens assembly works in cooperation with an image source 693. The image source plane 691 can be located at the image source 693. The type of the image source 693 may be a liquid crystal display, an OLED display, or a LED display, but is not limited thereto.

The first lens 610 with positive refractive power includes a visual-side surface 611 and an image source-side surface 612, the visual-side surface 611 of the first lens 610 is convex in a paraxial region thereof, the image source-side surface 612 of the first lens 610 is flat in a paraxial region thereof, and the visual-side surface 611 of the first lens 610 is aspheric.

The optical element 620 includes, in order from the visual side to the image source side, an absorptive polarizer, a reflective polarizer and a first phase retarder. The configuration of the three elements may refer to that of the absorptive polarizer 121, the reflective polarizer 122 and the first phase retarder 123 of the first embodiment and will not be explained again.

The second lens 630 with negative refractive power includes a visual-side surface 631 and an image source-side surface 632, the visual-side surface 631 of the second lens 630 is flat in a paraxial region thereof, the image source-side surface 632 of the second lens 630 is concave in a paraxial region thereof, and the image source-side surface 632 of the second lens 630 is aspheric.

The third lens 640 with negative refractive power includes a visual-side surface 641 and an image source-side surface 642, the visual-side surface 641 of the third lens 640 is convex in a paraxial region thereof, the image source-side surface 642 of the third lens 640 is concave in a paraxial region thereof, and the visual-side surface 641 and the image source-side surface 642 of the third lens 640 are aspheric.

The fourth lens 650 with positive refractive power includes a visual-side surface 651 and an image source-side surface 652, the visual-side surface 651 of the fourth lens 650 is convex in a paraxial region thereof, the image source-side surface 652 of the fourth lens 650 is convex in a paraxial region thereof, and the visual-side surface 651 and the image source-side surface 652 of the third lens 650 are aspheric.

The partial-reflective-partial-transmissive element 670 is disposed (for example, but not limited to, by coating) on the image source-side surface 652 of the fourth lens 650 and has an average light reflectance of at least 30%, preferably 50%, in the visible light range. The average light reflectance here is an average value of different reflectance of the partial-reflective-partial-transmissive element 670 for different wavelengths.

The second phase retarder 680 is disposed between the partial-reflective-partial-transmissive element 670 and the image source plane 691 and is closer to the image source plane 691. The second phase retarder 680 is, for example, but not limited to, a quarter-wave plate.

The detailed data of the sixth embodiment is shown in Tables 21-24.

TABLE 21

Embodiment 6
Far point: EFL_F = 30.03 mm, EPD (entrance pupil diameter) = 10.00 mm, FOV_F = 93.3 degrees
Near point: EFL_N = 29.31 mm, EPD (entrance pupil diameter) = 10.00 mm, FOV_N = 98.5 degrees

| Surface | | Curvature Radius | Thickness/gap | | Refractive Index (nd) | Abbe number (vd) | Focal length |
|---|---|---|---|---|---|---|---|
| 0 | | infinity | −10000.000 | (Far point) | — | — | — |
| | | | −143.000 | (Near point) | | | |
| 1 | Stop | infinity | 12.000 | | — | — | — |
| 2 | First lens | 433.607 | 2.000 | | 1.544 | 55.9 | 794.48 |
| 3 | Absorptive polarizer | infinity | 0.100 | | 1.533 | 56.0 | — |
| 4 | Reflective polarizer | infinity | 0.100 | | 1.533 | 56.0 | — |
| 5 | First phase retarder | infinity | 0.100 | | 1.533 | 56.0 | — |
| 6 | | infinity | 0.200 | | — | — | — |
| 7 | Second lens | infinity | 2.000 | | 1.661 | 20.4 | −265.05 |
| 8 | | 176.741 | 6.321 | (Far point) | — | — | — |
| | | | 1.040 | (Near point) | | | |
| 9 | Third lens | 1121.061 | 2.648 | | 1.544 | 55.9 | — |
| 10 | | 188.480 | 0.500 | | — | — | — |

TABLE 21-continued

Embodiment 6
Far point: EFL_F = 30.03 mm, EPD (entrance pupil diameter) = 10.00 mm, FOV_F = 93.3 degrees
Near point: EFL_N = 29.31 mm, EPD (entrance pupil diameter) = 10.00 mm, FOV_N = 98.5 degrees

| Surface | | Curvature Radius | Thickness/gap | | Refractive Index (nd) | Abbe number (vd) | Focal length |
|---|---|---|---|---|---|---|---|
| 11 | Fourth lens | 170.613 | 6.152 | | 1.544 | 55.9 | — |
| 12 | Partial-reflective-partial-transmissive element | −83.909 | −6.152 | | mirror | | — |
| 13 | | 170.613 | −0.500 | | — | — | — |
| 14 | Third lens | 188.480 | −2.648 | | 1.544 | 55.9 | — |
| 15 | | 1121.061 | −6.321 | (Far point) | — | — | — |
| | | | −1.040 | (Near point) | | | |
| 16 | Second lens | 176.741 | −2.000 | | 1.661 | 20.4 | — |
| 17 | | infinity | −0.200 | | — | — | — |
| 18 | First phase retarder | infinity | −0.100 | | 1.533 | 56.0 | — |
| 19 | Reflective polarizer | infinity | −0.100 | | 1.533 | 56.0 | — |
| 20 | | infinity | 0.100 | | mirror | | — |
| 21 | First phase retarder | infinity | 0.100 | | 1.533 | 56.0 | — |
| 22 | | infinity | 0.200 | | — | — | — |
| 23 | Second lens | infinity | 2.000 | | 1.661 | 20.4 | — |
| 24 | | 176.741 | 6.321 | (Far point) | — | — | — |
| | | | −.040 | (Near point) | | | |
| 25 | Third lens | 1121.061 | 2.648 | | 1.544 | 55.9 | −415.56 |
| 26 | | 188.480 | 0.500 | | — | — | — |
| 27 | Fourth lens | 170.613 | 6.152 | | 1.544 | 55.9 | 103.94 |
| 28 | Partial-reflective-partial-transmissive element | −83.909 | 0.720 | (Far point) | — | — | — |
| | | | 6.001 | (Near point) | | | |
| 29 | Second phase retarder | infinity | 0.100 | | 1.533 | 56.0 | — |
| 30 | Image source plane | infinity | — | | — | — | — |

TABLE 22

| Surface | 2 | 3 | 7 17 23 | 8 16 24 |
|---|---|---|---|---|
| K: | 0.0000E+00 | 0.0000E+00 | 0.0000E+00 | 0.0000E+00 |
| A4: | 3.7447E−07 | 0.0000E+00 | 0.0000E+00 | −5.0537E−06 |
| A6: | 3.4493E−09 | 0.0000E+00 | 0.0000E+00 | 1.4419E−08 |
| A8: | −1.4576E−11 | 0.0000E+00 | 0.0000E+00 | −2.4885E−11 |
| A10: | −2.1438E−14 | 0.0000E+00 | 0.0000E+00 | 9.5938E−15 |
| A12: | 5.8381E−17 | 0.0000E+00 | 0.0000E+00 | 7.5314E−18 |
| A14: | 0.0000E+00 | 0.0000E+00 | 0.0000E+00 | −2.8811E−20 |
| A16: | 0.0000E+00 | 0.0000E+00 | 0.0000E+00 | 3.4772E−23 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

| Surface | 9 15 25 | 10 14 26 | 11 13 27 | 12 28 |
|---|---|---|---|---|
| K: | 0.0000E+00 | 0.0000E+00 | 0.0000E+00 | 0.0000E+00 |
| A4: | 8.5063E−06 | −6.1739E−06 | 1.5157E−06 | 4.7173E−06 |
| A6: | −1.4120E−08 | 1.4620E−08 | −1.6223E−09 | −5.9674E−09 |
| A8: | −3.4920E−12 | −2.7951E−11 | −9.1529E−12 | 3.1975E−12 |
| A10: | 6.4774E−15 | 7.9874E−15 | −3.3008E−15 | −4.2514E−15 |
| A12: | 2.9711E−18 | 1.1756E−17 | 1.2539E−18 | −1.5384E−18 |
| A14: | −2.9960E−21 | −6.1795E−21 | 1.4097E−21 | 2.9230E−21 |
| A16: | 0.0000E+00 | 0.0000E+00 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

TABLE 23

| EFL_N(mm) | 29.31 | MS3_N(mm) | 15.40 |
|---|---|---|---|
| EFL_F(mm) | 30.03 | MS3_F(mm) | 10.12 |
| F_G1(mm) | −400.00 | MS2(mm) | 16.44 |
| F_G2(mm) | 137.36 | R1(mm) | 433.61 |
| T12_N(mm) | 1.04 | R2(mm) | 176.74 |
| T12_F(mm) | 6.32 | R3(mm) | 1121.06 |
| FOV_N(degrees) | 98.5 | R4(mm) | −83.91 |
| FOV_F(degrees) | 93.3 | TL(mm) | 20.94 |
| GCT1(mm) | 4.50 | IMH(mm) | 21.10 |
| GCT2(mm) | 9.30 | | |

TABLE 24

| f_G2/f_G1 | −0.34 | R1/(EFL_N * EFL_F)[mm$^{-1}$] | 0.49 |
|---|---|---|---|
| EFL_N * TL/(EFL_F * IMH) | 0.97 | EFL_F/R1 | 0.07 |
| MS2/EFL_F | 0.55 | TL/EFL_N | 0.71 |
| (T12_F − T12_N)/EFL_N | 0.18 | GCT2/GCT1 | 2.07 |
| GCT1/(MS2) | 0.27 | R4/R3 | −0.07 |
| f_G2/(MS3_N * MS3_F)[mm$^{-1}$] | 0.88 | MS2/f_G2 | 0.12 |
| MS3_F/f_G1 | −0.03 | FOV_F/(T12_F * IMH) | 0.70 |
| MS3_N/GCT2 | 1.66 | — | — |

In the sixth embodiment, the equation of the aspheric surface profiles of the aforementioned lenses is the same as the equation of the aspheric surface profiles of the aforementioned lenses in the first embodiment. The values of the parameters in Table 23 can be calculated from Tables 21 and 22. The values of the conditions in Table 24 can be calculated from Table 23. In Table 21, the definitions of the surfaces 0 to 7 are the same as those of the surfaces 0 to 7 of the first embodiment; the surfaces 8, 15 and 24 represent a gap between the second lens 630 and the third lens 640 along the optical axis 695; the surfaces 9, 14 and 25 represent the thickness of the third lens 640 along the optical axis 695; the surfaces 10 and 26 represent a gap between the third lens 640 and the fourth lens 650 along the optical axis 695; the surfaces 11 and 17 represent the thicknesses of the fourth lens 650 along the optical axis 695; the surfaces 12 and 28 represent the thicknesses of the partial-reflective-partial-transmissive element 670 along the optical axis 695; the surface 13 represents a gap between the partial-reflective-partial-transmissive element 670 and the third lens 640 along the optical axis 695; the surfaces 16 and 23 represent the thickness of the second lens 630 along the optical axis 695; the surfaces 17 and 22 represent a gap between the second lens 630 and the first phase retarder along the optical axis 695; surfaces 18 and 21 represent the thickness of the first phase retarder along the optical axis 695; the surfaces 19 and 20 represent the thickness of the reflective polarizer along the optical axis 695; the surface 29 represents the thickness of the second phase retarder 680 along the optical axis 695. The values of the parameters having a negative sign in the table represent light reflective transmission.

Seventh Embodiment

Figure 7A:
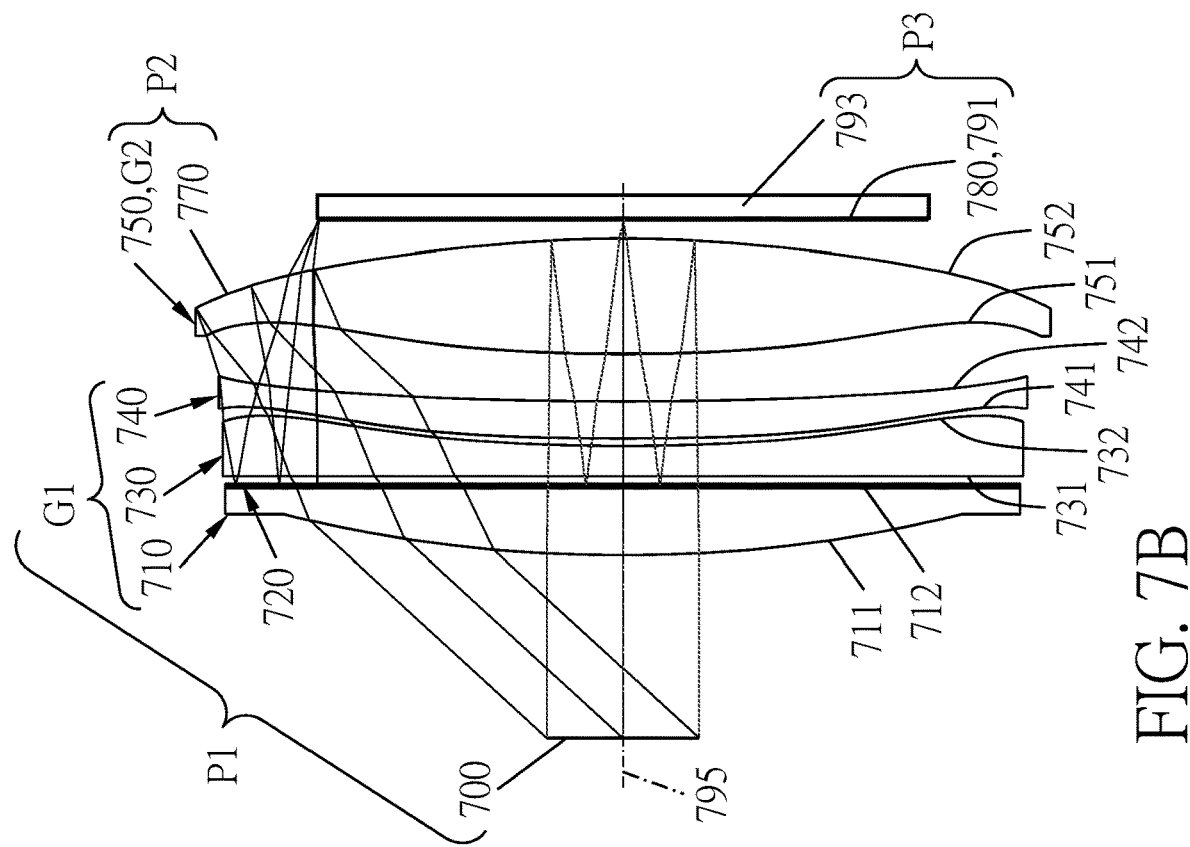
FIG. 7A shows an optical lens assembly focusing at a near point in accordance with a seventh embodiment of the present invention.
Figure 7B:
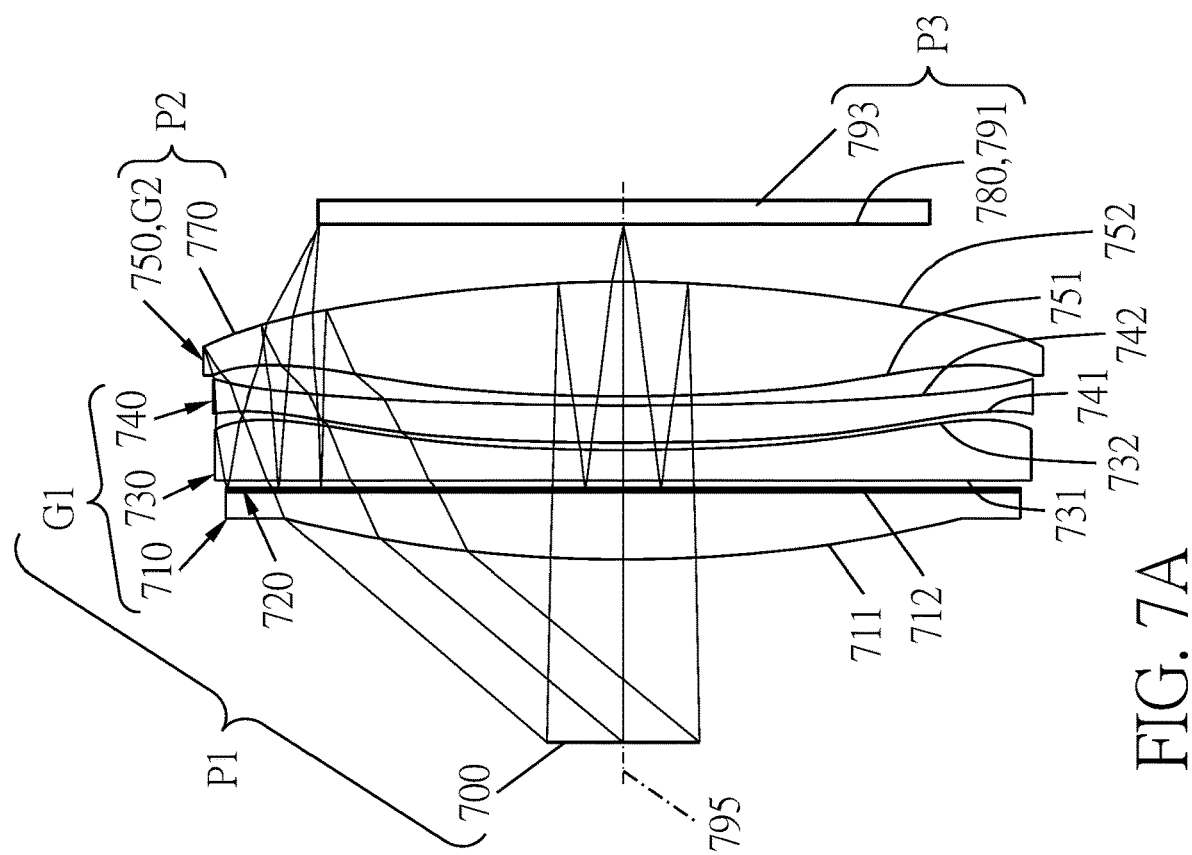
FIG. 7B shows the optical lens assembly focusing at a far point in accordance with the seventh embodiment of the present invention.

Referring to FIGS. 7A-7B, FIG. 7A shows an optical lens assembly focusing at a near point in accordance with a seventh embodiment of the present invention, and FIG. 7B shows the optical lens assembly focusing at a far point in accordance with the seventh embodiment of the present invention. The optical lens assembly includes, in order from a visual side to an image source side along an optical axis 795: a first group P1, a second group P2 and a third group P3. During focusing (or zooming) process, the second group P2 is movable relative to the first group P1 along the optical axis 795 between the first group P1 and the third group P3.

The first group P1 includes a stop 700, a first lens group G1 and an optical element 720. The stop 700 may be at where the user's eyes view the virtual image. The first lens group G1 includes, in order from the visual side to the image source side: a first lens 710, a second lens 730 and a third lens 740. The first lens 710 is located between the stop 700 and the optical element 720. The optical element 720 is located between the first lens 710 and the second lens 730. The second group P2 includes, in order from the visual side to the image source side: a second lens group G2 (that is, a fourth lens 750) with positive refractive power and a partial-reflective-partial-transmissive element 770. The third group P3 includes, in order from the visual side to the image source side: a second phase retarder 780 and an image source plane 791. The optical lens assembly has a total of four lenses with refractive power, but is not limited thereto. The optical lens assembly works in cooperation with an image source 793. The image source plane 791 can be located at the image source 793. The type of the image source 793 may be a liquid crystal display, an OLED display, or a LED display, but is not limited thereto.

The first lens 710 with positive refractive power includes a visual-side surface 711 and an image source-side surface 712, the visual-side surface 711 of the first lens 710 is convex in a paraxial region thereof, the image source-side surface 712 of the first lens 710 is flat in a paraxial region thereof, and the visual-side surface 711 of the first lens 710 is aspheric.

The optical element 720 includes, in order from the visual side to the image source side, an absorptive polarizer, a reflective polarizer and a first phase retarder. The configuration of the three elements may refer to that of the absorptive polarizer 121, the reflective polarizer 122 and the first phase retarder 123 of the first embodiment and will not be explained again.

The second lens 730 with negative refractive power includes a visual-side surface 731 and an image source-side surface 732, the visual-side surface 731 of the second lens 730 is flat in a paraxial region thereof, the image source-side surface 732 of the second lens 730 is concave in a paraxial region thereof, and the image source-side surface 732 of the second lens 730 is aspheric.

The third lens 740 with positive refractive power includes a visual-side surface 741 and an image source-side surface 742, the visual-side surface 741 of the third lens 740 is convex in a paraxial region thereof, the image source-side surface 742 of the third lens 740 is concave in a paraxial region thereof, and the visual-side surface 741 and the image source-side surface 742 of the third lens 740 are aspheric.

The fourth lens 750 with positive refractive power includes a visual-side surface 751 and an image source-side surface 752, the visual-side surface 751 of the fourth lens 750 is convex in a paraxial region thereof, the image source-side surface 752 of the fourth lens 750 is convex in a paraxial region thereof, and the visual-side surface 751 and the image source-side surface 752 of the third lens 750 are aspheric.

The partial-reflective-partial-transmissive element 770 is disposed (for example, but not limited to, by coating) on the image source-side surface 752 of the fourth lens 750 and has an average light reflectance of at least 30%, preferably 50%, in the visible light range. The average light reflectance here is an average value of different reflectance of the partial-reflective-partial-transmissive element 770 for different wavelengths.

The second phase retarder 780 is disposed between the partial-reflective-partial-transmissive element 770 and the image source plane 791 and is closer to the image source plane 791. The second phase retarder 780 is, for example, but not limited to, a quarter-wave plate.

The detailed data of the seventh embodiment is shown in Tables 25-28.

TABLE 25

Embodiment 7
Far point: EFL_F = 26.59 mm, EPD (entrance pupil diameter) = 10.00 mm, FOV_F = 95.0 degrees
Near point: EFL_N = 25.73 mm, EPD(entrance pupil diameter) = 10.00 mm, FOV_N = 100.0 degrees

| Surface | | Curvature Radius | Thickness/gap | | Refractive Index (nd) | Abbe number (vd) | Focal length |
|---|---|---|---|---|---|---|---|
| 0 | | infinity | 10000.000 | (Far point) | — | — | — |
| | | | −250.000 | (Near point) | | | |
| 1 | Stop | infinity | 12.000 | | — | — | — |
| 2 | First lens | 108.004 | 4.666 | | 1.544 | 55.9 | 197.89 |
| 3 | Absorptive | infinity | 0.100 | | 1.533 | 56.0 | — |

TABLE 25-continued

Embodiment 7
Far point: EFL_F = 26.59 mm, EPD (entrance pupil diameter) = 10.00 mm, FOV_F = 95.0 degrees
Near point: EFL_N = 25.73 mm, EPD(entrance pupil diameter) = 10.00 mm, FOV_N = 100.0 degrees

| Surface | | Curvature Radius | Thickness/gap | | Refractive Index (nd) | Abbe number (vd) | Focal length |
|---|---|---|---|---|---|---|---|
| | polarizer | | | | | | |
| 4 | Reflective polarizer | infinity | 0.100 | | 1.533 | 56.0 | — |
| 5 | First phase retarder | infinity | 0.100 | | 1.533 | 56.0 | — |
| 6 | | infinity | 0.200 | | — | — | — |
| 7 | Second lens | infinity | 2.000 | | 1.661 | 20.3 | −236.62 |
| 8 | | 157.784 | 0.500 | | — | — | — |
| 9 | Third lens | 280.029 | 2.433 | | 1.544 | 55.9 | 2553.21 |
| 10 | | 349.380 | 3.108 | (Far point) | — | — | — |
| | | | 0.600 | (Near point) | | | |
| 11 | Fourth lens | 151.205 | 7.548 | | 1.544 | 55.9 | — |
| 12 | Partial-reflective-partial-transmissive element | −89.350 | −7.548 | | mirror | | — |
| 13 | | 151.205 | −3.108 | (Far point) | — | — | — |
| | | | −0.600 | (Near point) | | | |
| 14 | Third lens | 349.380 | −2.433 | | 1.544 | 55.9 | — |
| 15 | | 280.029 | −0.500 | | — | — | — |
| 16 | Second lens | 157.784 | −2.000 | | 1.661 | 20.4 | — |
| 17 | | infinity | −0.200 | | — | — | — |
| 18 | First phase retarder | infinity | −0.100 | | 1.533 | 56.0 | — |
| 19 | Reflective polarizer | infinity | −0.100 | | 1.533 | 56.0 | — |
| 20 | | infinity | 0.100 | | mirror | | — |
| 21 | First phase retarder | infinity | 0.100 | | 1.533 | 56.0 | — |
| 22 | | infinity | 0.200 | | — | — | — |
| 23 | Second lens | infinity | 2.000 | | 1.661 | 20.4 | — |
| 24 | | 157.784 | 0.500 | | — | — | — |
| 25 | Third lens | 280.029 | 2.433 | | 1.544 | 55.9 | 2553.21 |
| 26 | | 349.380 | −3.108 | (Far point) | — | — | — |
| | | | −0.600 | (Near point) | | | |
| 27 | Fourth lens | 151.205 | 7.548 | | 1.544 | 55.9 | 104.06 |
| 28 | Partial-reflective-partial-transmissive element | −89.350 | 1.100 | (Far point) | — | — | — |
| | | | 3.608 | (Near point) | | | |
| 29 | Second phase retarder | infinity | 0.100 | | 1.533 | 56.0 | — |
| 30 | Image source plane | infinity | — | | — | — | — |

TABLE 26

| Surface | 2 | 3 | 7 17 23 | 8 16 24 |
|---|---|---|---|---|
| K: | 0.0000E+00 | 0.0000E+00 | 0.0000E+00 | 0.0000E+00 |
| A4: | 3.1610E−06 | 0.0000E+00 | 0.0000E+00 | 4.8852E−06 |
| A6: | −3.4606E−09 | 0.0000E+00 | 0.0000E+00 | −4.2538E−09 |
| A8: | 0.0000E+00 | 0.0000E+00 | 0.0000E+00 | −4.7005E−12 |
| A10: | 0.0000E+00 | 0.0000E+00 | 0.0000E+00 | 5.8503E−15 |
| A12: | 0.0000E+00 | 0.0000E+00 | 0.0000E+00 | −1.8649E−17 |
| A14: | 0.0000E+00 | 0.0000E+00 | 0.0000E+00 | 8.1727E−21 |
| A16: | 0.0000E+00 | 0.0000E+00 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

| Surface | 9 15 25 | 10 14 26 | 11 13 27 | 12 28 |
|---|---|---|---|---|
| K: | 0.0000E+00 | 0.0000E+00 | 0.0000E+00 | 0.0000E+00 |
| A4: | 7.9951E−06 | 7.7602E−07 | 9.3952E−06 | 2.9225E−06 |
| A6: | −6.1239E−09 | 1.9559E−09 | −1.5651E−08 | −1.1129E−09 |
| A8: | −3.0281E−12 | −8.1537E−12 | 0.0000E+00 | −2.8669E−12 |
| A10: | −2.4699E−15 | 9.1233E−15 | 0.0000E+00 | −3.6267E−15 |
| A12: | 0.0000E+00 | 0.0000E+00 | 0.0000E+00 | 3.7316E−18 |
| A14: | 0.0000E+00 | 0.0000E+00 | 0.0000E+00 | 0.0000E+00 |
| A16: | 0.0000E+00 | 0.0000E+00 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

TABLE 27

| EFL_N(mm) | 25.73 | MS3_N(mm) | 11.26 |
|---|---|---|---|
| EFL_F(mm) | 26.59 | MS3_F(mm) | 8.75 |
| F_G1(mm) | 762.02 | MS2(mm) | 11.86 |
| F_G2(mm) | 104.06 | R1(mm) | 108.00 |
| T12_N(mm) | 0.60 | R2(mm) | 349.38 |
| T12_F(mm) | 3.11 | R3(mm) | 151.21 |
| FOV_N(degrees) | 100.0 | R4(mm) | −89.35 |
| FOV_F(degrees) | 95.0 | TL(mm) | 21.96 |
| GCT1(mm) | 10.10 | IMH(mm) | 20.00 |
| GCT2(mm) | 7.55 | — | — |

TABLE 28

| f_G2/f_G1 | 0.14 | R1/(EFL_N * EFL_F)[mm$^{-1}$] | 0.16 |
|---|---|---|---|
| EFL_N * TL/(EFL_F * IMH) | 1.06 | EFL_F/R1 | 0.25 |
| MS2/EFL_F | 0.45 | TL/EFL_N | 0.85 |
| (T12_F − T12_N)/EFL_N | 0.10 | GCT2/GCT1 | 0.75 |
| GCT1/(MS2) | 0.85 | R4/R3 | −0.59 |
| f_G2/(MS3_N * MS3_F)[mm$^{-1}$] | 1.06 | MS2/f_G2 | 0.11 |
| MS3_F/f_G1 | 0.01 | FOV_F/(T12_F * IMH) | 1.53 |
| MS3_N/GCT2 | 1.49 | — | — |

In the seventh embodiment, the equation of the aspheric surface profiles of the aforementioned lenses is the same as the equation of the aspheric surface profiles of the aforementioned lenses in the first embodiment. The values of the parameters in Table 27 can be calculated from Tables 25 and 26. The values of the conditions in Table 28 can be calculated from Table 27. In Table 25, the definitions of the surfaces 0 to 30 are the same as those of the surfaces 0 to 30 of the sixth embodiment.

Eighth Embodiment

Figure 8A:
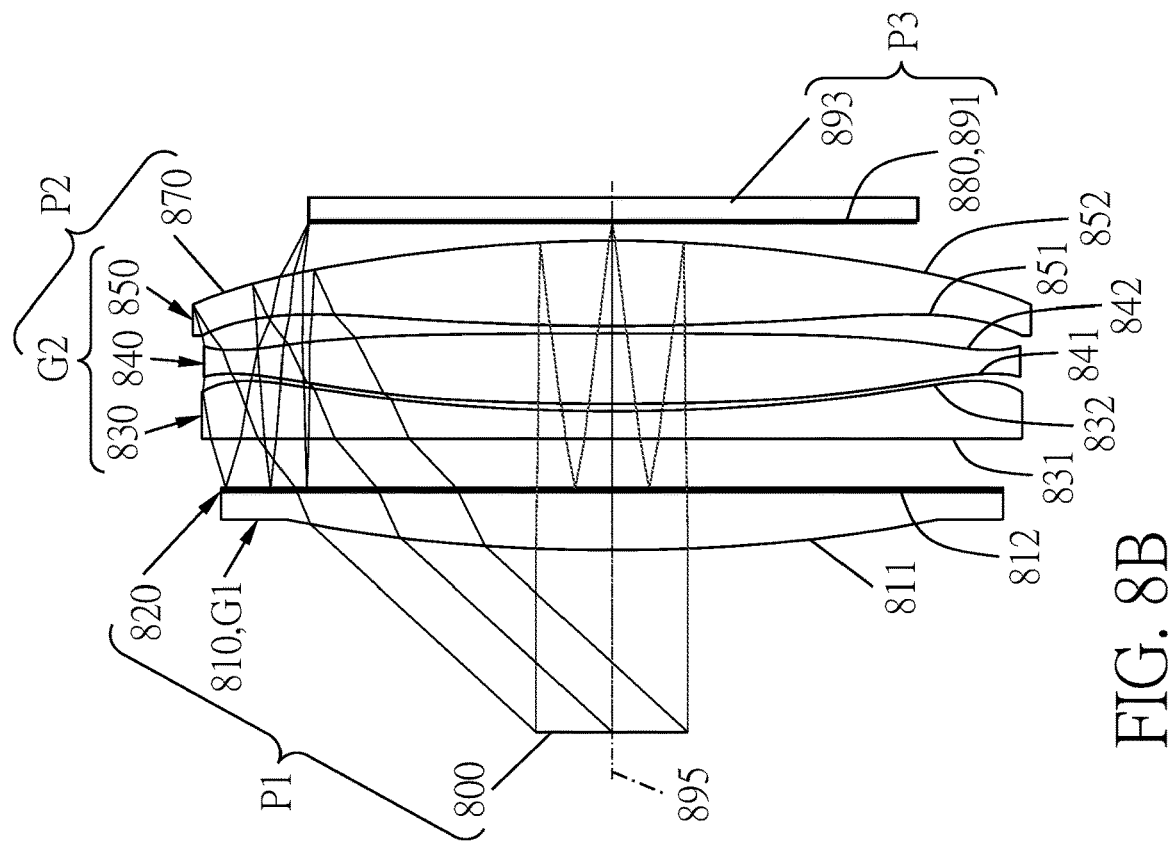
FIG. 8A shows an optical lens assembly focusing at a near point in accordance with an eighth embodiment of the present invention.
Figure 8B:
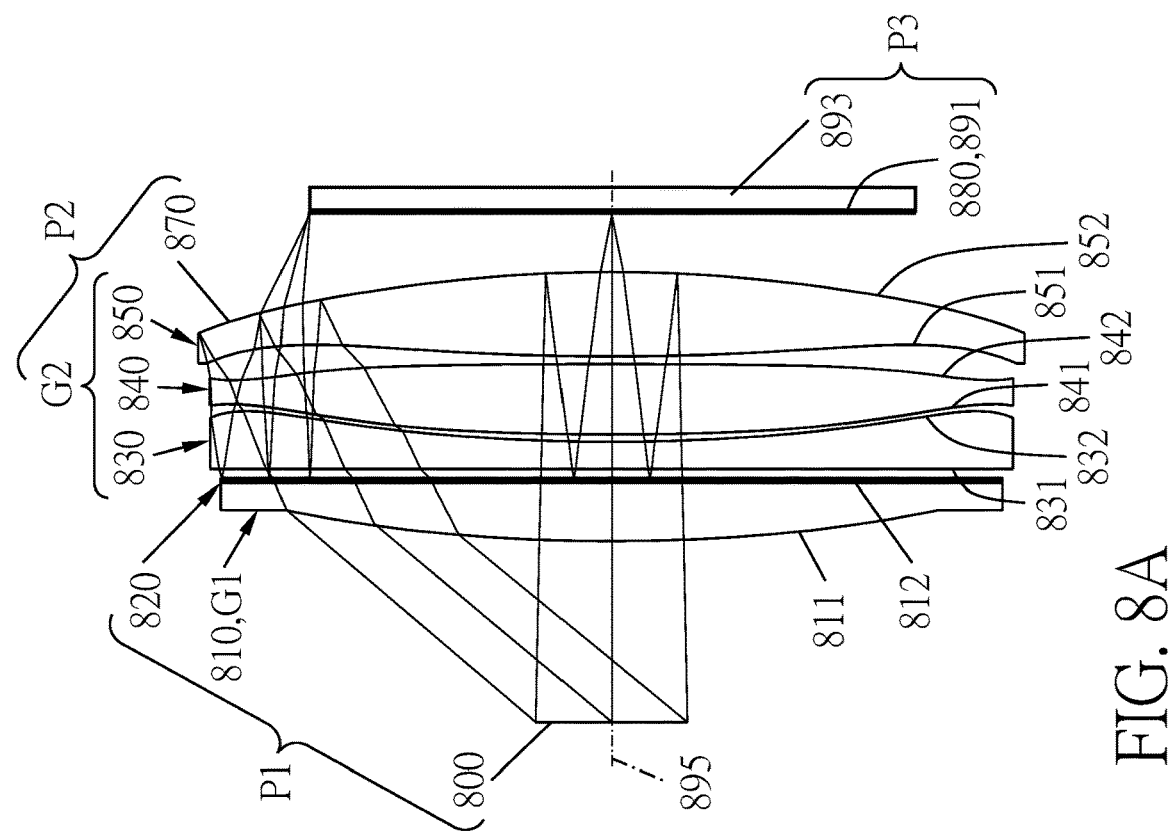
FIG. 8B shows the optical lens assembly focusing at a far point in accordance with the eighth embodiment of the present invention.

Referring to FIGS. 8A-8B, FIG. 8A shows an optical lens assembly focusing at a near point in accordance with an eighth embodiment of the present invention, and FIG. 8B shows the optical lens assembly focusing at a far point in accordance with the eighth embodiment of the present invention. The optical lens assembly includes, in order from a visual side to an image source side along an optical axis 895: a first group P1, a second group P2 and a third group P3. During focusing (or zooming) process, the second group P2 is movable relative to the first group P1 along the optical axis 895 between the first group P1 and the third group P3.

The first group P1 includes a stop 800, a first lens group G1 (that is, a first lens 810) and an optical element 820. The stop 800 may be at where the user's eyes view the virtual image. The first lens 810 is located between the stop 800 and the optical element 820. The second group P2 includes, in order from the visual side to the image source side: a second lens group G2 with positive refractive power and a partial-reflective-partial-transmissive element 870. The second lens group G2 includes, in order from the visual side to the image source side: a second lens 830, a third lens 840 and a fourth lens 850. The third group P3 includes, in order from the visual side to the image source side: a second phase retarder 880 and an image source plane 891. The optical lens assembly has a total of four lenses with refractive power, but is not limited thereto. The optical lens assembly works in cooperation with an image source 893. The image source plane 891 can be located at the image source 893. The type of the image source 893 may be a liquid crystal display, an OLED display, or a LED display, but is not limited thereto.

The first lens 810 with positive refractive power includes a visual-side surface 811 and an image source-side surface 812, the visual-side surface 811 of the first lens 810 is convex in a paraxial region thereof, the image source-side surface 812 of the first lens 810 is flat in a paraxial region thereof, and the visual-side surface 811 of the first lens 810 is aspheric.

The optical element 820 includes, in order from the visual side to the image source side, an absorptive polarizer, a reflective polarizer and a first phase retarder. The configuration of the three elements may refer to that of the absorptive polarizer 121, the reflective polarizer 122 and the first phase retarder 123 of the first embodiment and will not be explained again.

The second lens 830 with negative refractive power includes a visual-side surface 831 and an image source-side surface 832, the visual-side surface 831 of the second lens 830 is flat in a paraxial region thereof, the image source-side surface 832 of the second lens 830 is concave in a paraxial region thereof, and the image source-side surface 832 of the second lens 830 is aspheric.

The third lens 840 with positive refractive power includes a visual-side surface 841 and an image source-side surface 842, the visual-side surface 841 of the third lens 840 is convex in a paraxial region thereof, the image source-side surface 842 of the third lens 840 is convex in a paraxial region thereof, and the visual-side surface 841 and the image source-side surface 842 of the third lens 840 are aspheric.

The fourth lens 850 with positive refractive power includes a visual-side surface 851 and an image source-side surface 852, the visual-side surface 851 of the fourth lens 850 is convex in a paraxial region thereof, the image source-side surface 852 of the fourth lens 850 is convex in a paraxial region thereof, and the visual-side surface 851 and the image source-side surface 852 of the third lens 850 are aspheric.

The partial-reflective-partial-transmissive element 870 is disposed (for example, but not limited to, by coating) on the image source-side surface 852 of the fourth lens 850 and has an average light reflectance of at least 30%, preferably 50%, in the visible light range. The average light reflectance here is an average value of different reflectance of the partial-reflective-partial-transmissive element 870 for different wavelengths.

The second phase retarder 880 is disposed between the partial-reflective-partial-transmissive element 870 and the image source plane 891 and is closer to the image source plane 891. The second phase retarder 880 is, for example, but not limited to, a quarter-wave plate.

The detailed data of the eighth embodiment is shown in Tables 29-32.

TABLE 29

Embodiment 8
Far point: EFL_F = 26.66 mm, EPD (entrance pupil diameter) = 10.00 mm, FOV_F = 95.0 degrees
Near point: EFL_N = 25.48 mm, EPD(entrance pupil diameter) = 10.00 mm, FOV_N = 100.3 degrees

| Surface | | Curvature Radius | Thickness/gap | | Refractive Index (nd) | Abbe number (vd) | Focal length |
|---|---|---|---|---|---|---|---|
| 0 | | infinity | −10000.000 | (Far point) | — | — | — |
| | | | −250.000 | (Near point) | | | |
| 1 | Stop | infinity | 12.000 | | — | — | — |
| 2 | First lens | 135.896 | 4.000 | | 1.544 | 55.9 | 248.99 |
| 3 | Absorptive polarizer | infinity | 0.100 | | 1.533 | 56.0 | — |
| 4 | Reflective polarizer | infinity | 0.100 | | 1.533 | 56.0 | — |
| 5 | First phase retarder | infinity | 0.100 | | 1.533 | 56.0 | — |
| 6 | | infinity | 2.963 | (Far point) | — | — | — |
| | | | 0.300 | (Near point) | | | |
| 7 | Second lens | infinity | 1.800 | | 1.661 | 20.3 | −236.62 |
| 8 | | 129.848 | 0.500 | | — | — | — |
| 9 | Third lens | 263.439 | 4.649 | | 1.544 | 55.9 | 2553.21 |
| 10 | | −752.783 | 0.500 | | — | — | — |

TABLE 29-continued

Embodiment 8
Far point: EFL_F = 26.66 mm, EPD (entrance pupil diameter) = 10.00 mm, FOV_F = 95.0 degrees
Near point: EFL_N = 25.48 mm, EPD(entrance pupil diameter) = 10.00 mm, FOV_N = 100.3 degrees

| Surface | | Curvature Radius | Thickness/gap | | Refractive Index (nd) | Abbe number (vd) | Focal length |
|---|---|---|---|---|---|---|---|
| 11 | Fourth lens | 187.730 | 5.602 | | 1.544 | 55.9 | — |
| 12 | Partial-reflective-partial-transmissive element | −91.924 | −5.602 | | mirror | | |
| 13 | | 187.730 | −0.500 | | — | — | — |
| 14 | Third lens | −752.783 | −4.649 | | 1.544 | 55.9 | — |
| 15 | | 263.439 | −0.500 | | — | — | — |
| 16 | Second lens | 129.848 | −1.800 | | 1.661 | 20.4 | — |
| 17 | | infinity | −2.963 | (Far point) | — | — | — |
| | | | −0.3 | (Near point) | | | |
| 18 | First phase retarder | infinity | −0.100 | | 1.533 | 56.0 | — |
| 19 | Reflective polarizer | infinity | −0.100 | | 1.533 | 56.0 | — |
| 20 | | infinity | 0.100 | | mirror | | |
| 21 | First phase retarder | infinity | 0.100 | | 1.533 | 56.0 | — |
| 22 | | infinity | 2.963 | (Far point) | — | — | — |
| | | | 0.300 | (Near point) | | | |
| 23 | Second lens | infinity | 1.800 | | 1.661 | 20.4 | — |
| 24 | | 129.848 | 0.500 | | — | — | — |
| 25 | Third lens | 263.439 | 4.649 | | 1.544 | 55.9 | 2553.21 |
| 26 | | −752.783 | 0.500 | | — | — | — |
| 27 | Fourth lens | 187.730 | 5.602 | | 1.544 | 55.9 | 104.06 |
| 28 | Partial-reflective-partial-transmissive element | −91.924 | 1.100 | (Far point) | — | — | — |
| | | | 3.763 | (Near poing) | | | |
| 29 | Second phase retarder | infinity | 0.100 | | 1.533 | 56.0 | — |
| 30 | Image source plane | infinity | — | | — | — | — |

TABLE 30

| Surface | 2 | 3 | 7  17  23 | 8  16  24 |
|---|---|---|---|---|
| K: | 0.0000E+00 | 0.0000E+00 | 0.0000E+00 | 0.0000E+00 |
| A4: | 1.9522E−06 | 0.0000E+00 | 0.0000E+00 | −1.0252E−06 |
| A6: | −1.1557E−09 | 0.0000E+00 | 0.0000E+00 | 3.8933E−09 |
| A8: | 0.0000E+00 | 0.0000E+00 | 0.0000E+00 | 3.2503E−14 |
| A10: | 0.0000E+00 | 0.0000E+00 | 0.0000E+00 | −1.6958E−16 |
| A12: | 0.0000E+00 | 0.0000E+00 | 0.0000E+00 | −1.7513E−17 |
| A14: | 0.0000E+00 | 0.0000E+00 | 0.0000E+00 | 1.4066E−21 |
| A16: | 0.0000E+00 | 0.0000E+00 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

| Surface | 9  15  25 | 10  14  26 | 11  13  27 | 12  28 |
|---|---|---|---|---|
| K: | 0.0000E+00 | 0.0000E+00 | 0.0000E+00 | 0.0000E+00 |
| A4: | 6.1618E−06 | 1.1448E−06 | 1.7092E−06 | 1.8830E−06 |
| A6: | −8.6748E−09 | −6.9143E−09 | −8.9320E−09 | −1.4188E−09 |
| A8: | 1.3988E−11 | −1.1185E−11 | 0.0000E+00 | 2.3431E−12 |
| A10: | −1.6905E−14 | 2.3858E−14 | 0.0000E+00 | −8.0578E−15 |
| A12: | 0.0000E+00 | 0.0000E+00 | 0.0000E+00 | 4.3251E−18 |
| A14: | 0.0000E+00 | 0.0000E+00 | 0.0000E+00 | 0.0000E+00 |
| A16: | 0.0000E+00 | 0.0000E+00 | 0.0000E+00 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

TABLE 31

| EFL_N(mm) | 25.48 | MS3_N(mm) | 16.91 |
|---|---|---|---|
| EFL_F(mm) | 26.66 | MS3_F(mm) | 14.25 |
| F_G1(mm) | 248.99 | MS2(mm) | 17.51 |
| F_G2(mm) | 151.04 | R1(mm) | 135.90 |
| T12_N(mm) | 0.60 | R2(mm) | infinity |
| T12_F(mm) | 3.26 | R3(mm) | infinity |
| FOV_N(degrees) | 100.3 | R4(mm) | −91.92 |
| FOV_F(degrees) | 95.0 | TL(mm) | 21.51 |
| GCT1(mm) | 4.00 | IMH(mm) | 20.00 |
| GCT2(mm) | 13.05 | — | — |

TABLE 32

| f_G2/f_G1 | 0.61 | R1/(EFL_N * EFL_F)[mm$^{-1}$] | 0.20 |
|---|---|---|---|
| EFL_N * TL/(EFL_F * IMH) | 1.03 | EFL_F/R1 | 0.20 |
| MS2/EFL_F | 0.66 | TL/EFL_N | 0.84 |
| (T12_F − T12_N)/EFL_N | 0.10 | GCT2/GCT1 | 3.26 |
| GCT1/(MS2) | 0.23 | R4/R3 | 0.00 |
| f_G2/(MS3_N * MS3_F)[mm$^{-1}$] | 0.63 | MS2/f_G2 | 0.12 |
| MS3_F/f_G1 | 0.06 | FOV_F/(T12_F * IMH) | 1.46 |
| MS3_N/GCT2 | 1.30 | — | — |

In the eighth embodiment, the equation of the aspheric surface profiles of the aforementioned lenses is the same as the equation of the aspheric surface profiles of the aforementioned lenses in the first embodiment. The values of the parameters in Table 31 can be calculated from Tables 29 and 30. The values of the conditions in Table 32 can be calculated from Table 31. In Table 29, the definitions of the surfaces 0 to 30 are the same as those of the surfaces 0 to 30 of the sixth embodiment.

For the optical lens assembly in the present invention, the lenses can be made of plastic or glass. If the lenses are made of plastic, it is conducive to reducing the manufacturing cost. If the lenses are made of glass, it is conducive to enhancing the degree of freedom in the arrangement of refractive power of the optical lens assembly. Moreover, one or both of the visual-side and image source-side surfaces of one or more lenses of the optical lens assembly can be aspheric, and the aspheric surface can have any profile shape other than the profile shape of a spherical surface, so more variables can be used in the design of aspheric surfaces (than spherical surfaces), which is conducive to reducing the aberration and the number of lenses, as well as the total length of the optical lens assembly.

In the present optical lens assembly, if the surface shape of a respective lens surface of a respective lens with refractive power is convex and the location of the convex portion of the respective lens surface of the respective lens is not defined, the convex portion is typically located in a paraxial region of the respective lens surface of the respective lens. If the surface shape of a respective lens surface of a respective lens is concave and the location of the concave portion of the respective lens surface of the respective lens is not defined, the concave portion is typically located in a paraxial region of the respective lens surface of the respective lens.

Figure 9:
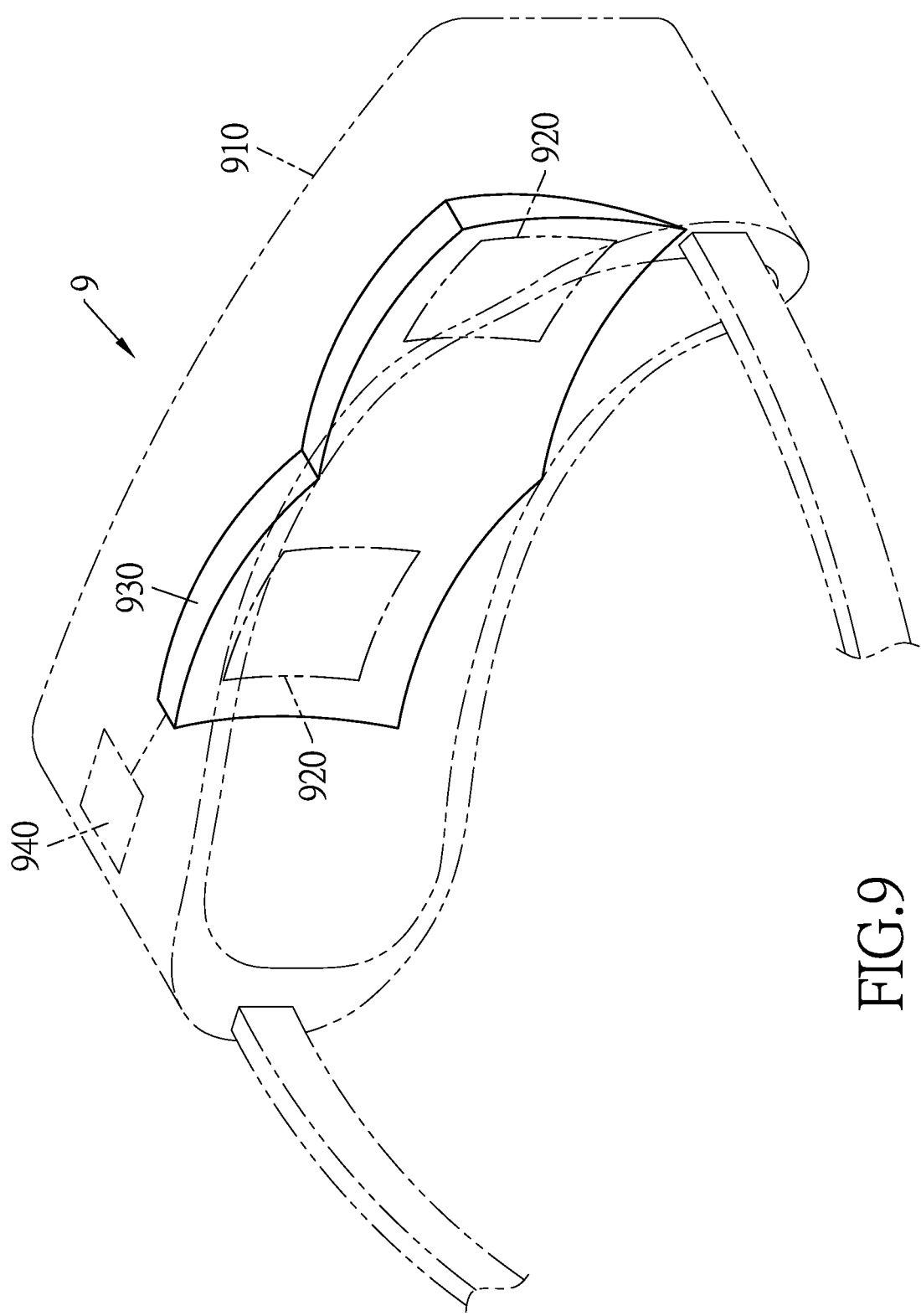
FIG. 9 shows a head-mounted electronic device in accordance with an embodiment of the present invention.

The optical lens assembly of the present invention can be used in head-mounted electronic devices as required. Referring to FIG. 9, which shows a head-mounted electronic device in accordance with an embodiment of the present invention, the head-mounted electronic device 9 is a head-mounted display device using, but not limited to, virtual reality (VR) technology, and includes a housing 910, an optical module 920, an image source 930 and a controller 940. The optical module 920, the image source 930 and the controller 940 are disposed in the housing 910.

The optical module 920 corresponds to the left and right eyes of the user. The optical module 920 includes an optical lens assembly that may be the optical lens assembly described in any one of the first to ninth embodiments.

The image source 930 may be the image source described in any one of the first to ninth embodiments. The image source 930 corresponds to the left and right eyes of the user, and the type of the image source 930 may be a liquid crystal display, LED display, or OLED display, but is not limited thereto.

The controller 940 is electrically connected to the image source 930, so as to control the image source 930 to display an image, whereby the head-mounted electronic device 9 can project the image to the eyes of the user to form a virtual image.

What is claimed is:

1. An optical lens assembly comprising three groups comprising, in order from a visual side to an image source side:
   a first group including:
      a first lens group including one, two, or three lenses, and a visual-side surface of the lens of the first lens group which is closest to the visual side, being convex in a paraxial region thereof; and
      an optical element including, in order from the visual side to the image source side: an absorptive polarizer, a reflective polarizer and a first phase retarder;
   a second group including, in order from the visual side to the image source side:
      a second lens group with positive refractive power, including one, two, or three lenses, and an image source-side surface of the lens of the second lens group which is closest to the image source side, being convex in a paraxial region thereof; and
      a partial-reflective-partial-transmissive element; and
   a third group including, in order from the visual side to the image source side: a second phase retarder and an image source plane;
   wherein a focal length of the first lens group is f_G1, a focal length of the second lens group is f_G2, a focal length of the optical lens assembly focusing at a near point is EFL_N, a focal length of the optical lens assembly focusing at a far point is EFL_F, a distance from the visual-side surface of the lens of the first lens group which is closest to the visual side, to the image source plane along an optical axis is TL, a maximum image-source height of the optical lens assembly is IMH, and following conditions are satisfied: −0.48<f_G2/f_G1<2.15 and 0.51<EFL_N*TL/(EFL_F*IMH)<1.56.

2. The optical lens assembly as claimed in claim 1, wherein a distance from an image source-side surface of the lens of the first lens group which is closest to the image source side, to the image source plane along the optical axis is MS2, the focal length of the optical lens assembly focusing at the far point is EFL_F, and a following condition is satisfied: 0.27<MS2/EFL_F<0.92.

3. The optical lens assembly as claimed in claim 1, wherein a distance from an image source-side surface of the lens of the first lens group which is closest to the image source side, to a visual-side surface of the lens of the second lens group which is closest to the visual side, along the optical axis when the optical lens assembly focuses at the far point, is T12_F, a distance from the image source-side surface of the lens of the first lens group which is closest to the image source side, to the visual-side surface of the lens of the second lens group which is closest to the visual side, along the optical axis when the optical lens assembly focuses at the near point, is T12_N, the focal length of the optical lens assembly focusing at the near point is EFL_N, and a following condition is satisfied: 0.06<(T12_F−T12_N)/EFL_N<0.50.

4. The optical lens assembly as claimed in claim 1, wherein a distance from the visual-side surface of the lens of the first lens group which is closest to the visual side, to an image source-side surface of the lens of the first lens group which is closest to the image source side, along the optical axis is GCT1, a distance from the image source-side surface of the lens of the first lens group which is closest to the image source side, to the image source plane along the optical axis is MS2, and a following condition is satisfied: 0.11<GCT1/MS2<1.19.

5. The optical lens assembly as claimed in claim 1, wherein the focal length of the second lens group is f_G2, a distance from a visual-side surface of the lens of the second lens group which is closest to the visual side, to the image source plane along the optical axis when the optical lens assembly focuses at the near point, is MS3_N, a distance from the visual-side surface of the lens of the second lens group which is closest to the visual side, to the image source plane along the optical axis when the optical lens assembly focuses at the far point, is MS3_F, and a following condition is satisfied: 0.38 mm$^{-1}$<f_G2/(MS3_N*MS3_F)<3.06 mm$^{-1}$.

6. The optical lens assembly as claimed in claim 1, wherein a distance from a visual-side surface of the lens of the second lens group which is closest to the visual side, to the image source plane along the optical axis when the optical lens assembly focuses at the far point, is MS3_F, the focal length of the first lens group is f_G1, and a following condition is satisfied: −0.04<MS3_F/f_G 1<0.10.

7. The optical lens assembly as claimed in claim 1, wherein a distance from a visual-side surface of the lens of the second lens group which is closest to the visual side, to the image source plane along the optical axis when the optical lens assembly focuses at the near point, is MS3_N, a distance from the visual-side surface of the lens of the second lens group which is closest to the visual side, to the image source-side surface of the lens of the second lens group which is closest to the image source side, along the optical axis is GCT2, and a following condition is satisfied: 0.78<MS3_N/GCT2<3.98.

8. The optical lens assembly as claimed in claim 1, wherein a radius of curvature of the visual-side surface of the lens of the first lens group which is closest to the visual side is R1, the focal length of the optical lens assembly focusing at the near point is EFL_N, the focal length of the optical lens assembly focusing at the far point is EFL_F, and a following condition is satisfied: 0.06 mm$^{-1}$<R1/(EFL_N*EFL_F)<1.48 mm$^{-1}$.

9. The optical lens assembly as claimed in claim 1, wherein the focal length of the optical lens assembly focusing at the far point is EFL_F, a radius of curvature of the visual-side surface of the lens of the first lens group which is closest to the visual side is R1, and a following condition is satisfied: 0.02<EFL_F/R1<0.45.

10. The optical lens assembly as claimed in claim 1, wherein the distance from the visual-side surface of the lens of the first lens group which is closest to the visual side, to the image source plane along the optical axis is TL, the focal length of the optical lens assembly focusing at the near point is EFL_N, and a following condition is satisfied: 0.43<TL/EFL_N<1.35.

11. The optical lens assembly as claimed in claim 1, wherein a distance from the visual-side surface of the lens of the first lens group which is closest to the visual side, to an image source-side surface of the lens of the first lens group which is closest to the image source side, along the optical axis is GCT1, a distance from a visual-side surface of the lens of the second lens group which is closest to the visual side, to the image source-side surface of the lens of the second lens group which is closest to the image source side, along the optical axis is GCT2, and a following condition is satisfied: 0.45<GCT2/GCT1<4.64.

12. The optical lens assembly as claimed in claim 1, wherein a radius of curvature of a visual-side surface of the lens of the second lens group which is closest to the visual side is R3, a radius of curvature of the image source-side surface of the lens of the second lens group which is closest to the image source side is R4, and a following condition is satisfied: −0.83<R4/R3<0.54.

13. The optical lens assembly as claimed in claim 1, wherein a distance from an image source-side surface of the lens of the first lens group which is closest to the image source side, to the image source plane along the optical axis is MS2, the focal length of the second lens group is f_G2, and a following condition is satisfied: 0.04<MS2/f_G2<0.18.

14. The optical lens assembly as claimed in claim 1, wherein a maximum field of view of the optical lens assembly focusing at the far point is FOV_F, a distance from an image source-side surface of the lens of the first lens group which is closest to the image source side, to a visual-side surface of the lens of the second lens group which is closest to the visual side, along the optical axis when the optical lens assembly focuses at the far point, is T12_F, the maximum image-source height of the optical lens assembly is IMH, and a following condition is satisfied: 0.18<FOV_F/(T12_F*<3.18.

15. A head-mounted electronic device, comprising:
a housing;
an optical lens assembly being disposed in the housing;
an image source being disposed on an image source plane of the optical lens assembly in the housing; and
a controller being disposed in the housing and electrically connected to the image source;
wherein the optical lens assembly comprises three groups comprising, in order from a visual side to an image source side:
a first group including:
a first lens group including one, two, or three lenses, and a visual-side surface of the lens of the first lens group which is closest to the visual side, being convex in a paraxial region thereof; and
an optical element including, in order from the visual side to the image source side: an absorptive polarizer, a reflective polarizer and a first phase retarder;
a second group including, in order from the visual side to the image source side:
a second lens group with positive refractive power, including one, two, or three lenses, and an image source-side surface of the lens of the second lens group which is closest to the image source side, being convex in a paraxial region thereof; and
a partial-reflective-partial-transmissive element; and
a third group including, in order from the visual side to the image source side: a second phase retarder and an image source plane;
wherein a focal length of the first lens group is f_G1, a focal length of the second lens group is f_G2, a focal length of the optical lens assembly focusing at a near point is EFL_N, a focal length of the optical lens assembly focusing at a far point is EFL_F, a distance from the visual-side surface of the lens of the first lens group which is closest to the visual side, to the image source plane along an optical axis is TL, a maximum image-source height of the optical lens assembly is IMH, and following conditions are satisfied: −0.48<f_G2/f_G1<2.15 and 0.51<EFL_N*TL/(EFL_F*IMH)<1.56.

16. The head-mounted electronic device as claimed in claim 15, wherein a distance from an image source-side surface of the lens of the first lens group which is closest to the image source side, to the image source plane along the optical axis is MS2, the focal length of the optical lens assembly focusing at the far point is EFL_F, and a following condition is satisfied: 0.27<MS2/EFL_F*<0.92.

17. The head-mounted electronic device as claimed in claim 15, wherein the focal length of the second lens group is f_G2, a distance from a visual-side surface of the lens of the second lens group which is closest to the visual side, to the image source plane along the optical axis when the optical lens assembly focuses at the near point, is MS3_N, a distance from the visual-side surface of the lens of the second lens group which is closest to the visual side, to the image source plane along the optical axis when the optical lens assembly focuses at the far point, is MS3_F, and a following condition is satisfied: 0.38 mm$^{-1}$<f_G2/(MS3_N*MS3_F)<3.06 mm$^{-1}$.

18. The head-mounted electronic device as claimed in claim 15, wherein a distance from the visual-side surface of the lens of the first lens group which is closest to the visual side, to an image source-side surface of the lens of the first lens group which is closest to the image source side, along the optical axis is GCT1, a distance from a visual-side surface of the lens of the second lens group which is closest to the visual side, to the image source-side surface of the lens of the second lens group which is closest to the image source side, along the optical axis is GCT2, and a following condition is satisfied: 0.45<GCT2/GCT1<4.64.

19. The head-mounted electronic device as claimed in claim 15, wherein a radius of curvature of a visual-side surface of the lens of the second lens group which is closest to the visual side is R3, a radius of curvature of the image source-side surface of the lens of the second lens group which is closest to the image source side is R4, and a following condition is satisfied: $-0.83<R4/R3<0.54$.

20. The head-mounted electronic device as claimed in claim 15, wherein a maximum field of view of the optical lens assembly focusing at the far point is FOV_F, a distance from an image source-side surface of the lens of the first lens group which is closest to the image source side, to a visual-side surface of the lens of the second lens group which is closest to the visual side, along the optical axis when the optical lens assembly focuses at the far point, is T12_F, the maximum image-source height of the optical lens assembly is IMH, and a following condition is satisfied: $0.18<FOV\_F/(T12\_F*IMH)<3.18$.

* * * * *